US011567592B2

(12) United States Patent
Chauvin et al.

(10) Patent No.: US 11,567,592 B2
(45) Date of Patent: Jan. 31, 2023

(54) SURFACE CLASSIFICATION AND SENSOR TUNING FOR A COMPUTER PERIPHERAL DEVICE

(71) Applicant: Logitech Europe S.A., Lausanne (CH)

(72) Inventors: Nicolas Chauvin, Chexbres (CH); François Morier, Romanel-sur-Lausanne (CH)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 17/743,180

(22) Filed: May 12, 2022

(65) Prior Publication Data

US 2022/0326788 A1     Oct. 13, 2022

Related U.S. Application Data

(63) Continuation of application No. 16/913,391, filed on Jun. 26, 2020, now Pat. No. 11,347,327.

(51) Int. Cl.
*G06F 3/0354* (2013.01)
*G06F 3/03* (2006.01)

(52) U.S. Cl.
CPC ........ *G06F 3/03544* (2013.01); *G06F 3/0304* (2013.01)

(58) Field of Classification Search
CPC ........................... G06F 3/0304; G06F 3/03544

USPC .................................................. 345/166, 173
See application file for complete search history.

(56) References Cited

U.S. PATENT DOCUMENTS

2011/0074683 A1*   3/2011   Bilbrey ................ G06F 3/0304
                                                        345/166

* cited by examiner

*Primary Examiner* — Calvin C Ma
(74) *Attorney, Agent, or Firm* — Kilpatrick Townsend & Stockton LLP

(57) ABSTRACT

A computer peripheral device (e.g., a computer mouse) includes an optical sensor configured to generate optical data corresponding to a surface that the computer peripheral device is placed upon and a processor(s) configured to determine, based on the optical data, a relative displacement of the computer peripheral device along the surface, identify one or more characteristics of the surface based on the optical data; compare the one or more characteristics with one or more corresponding baseline characteristics stored in memory; classify, based on the comparing of the one or more characteristics with one or more corresponding baseline characteristics, a type of the surface; and adjust, based on the classified type of the surface, an aspect of the determination of the relative displacement of the peripheral device or an operation of the optical sensor that alters the generating of the optical data.

14 Claims, 12 Drawing Sheets

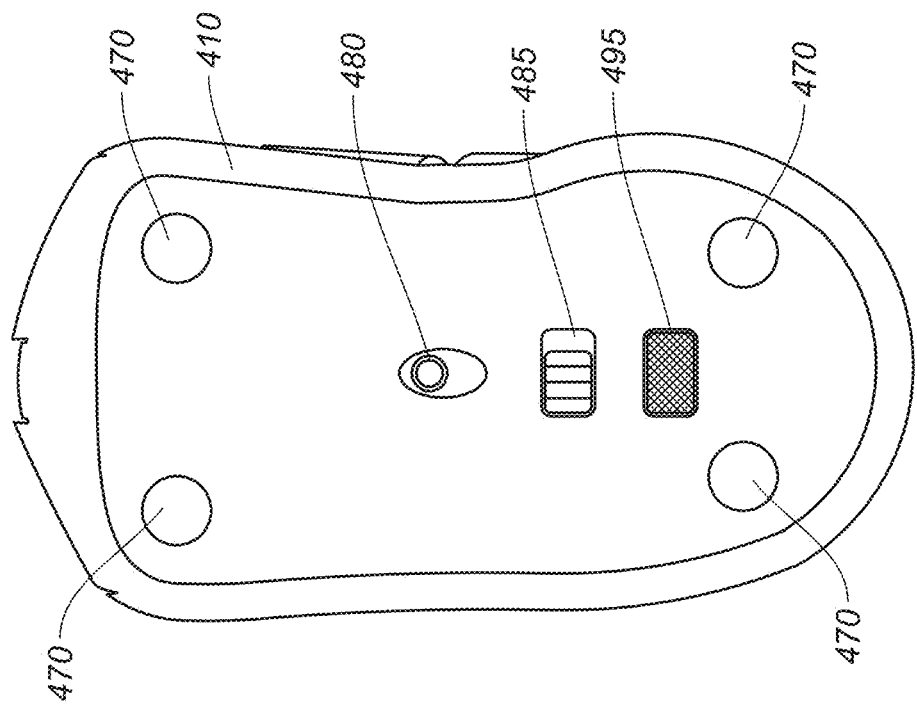
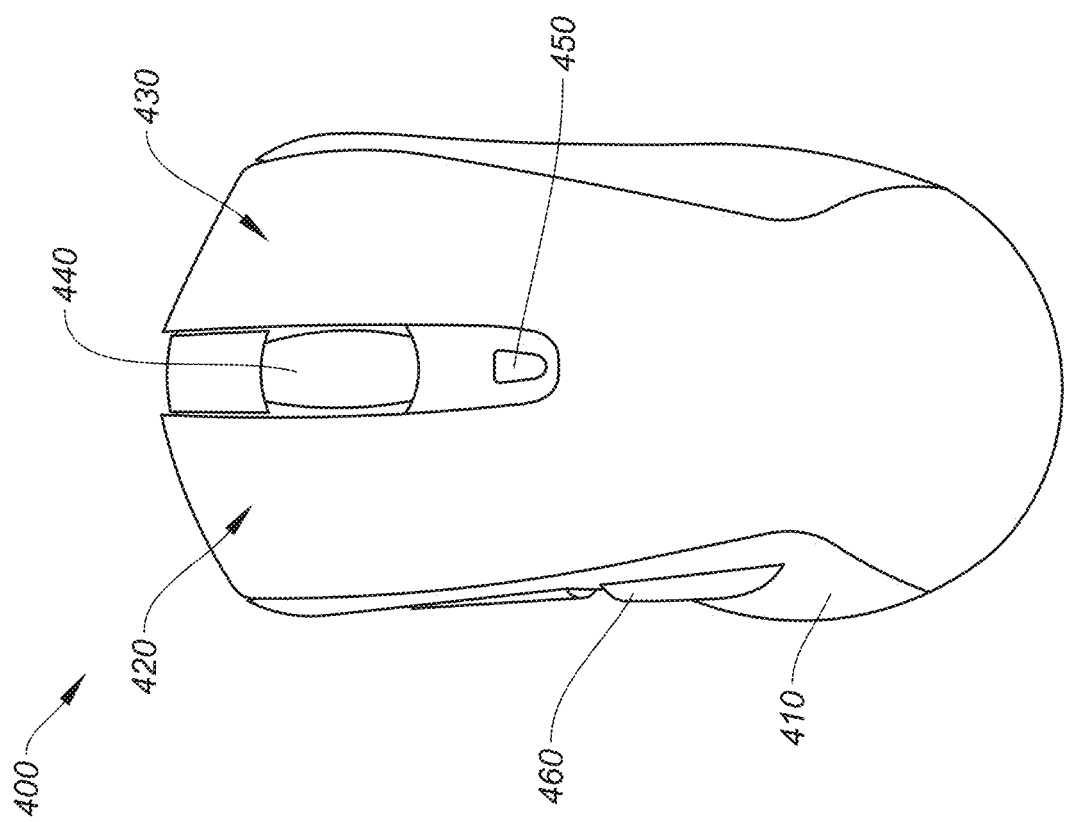
FIG. 4B
FIG. 4A

| Interface | Contrast | # of Features |
|---|---|---|
| Mouse Pad | High | High |
| Desk Surface | Low | Medium |
| Glass | Very Low | Very Low |

SURFACE CLASSIFICATION AND SENSOR TUNING FOR A COMPUTER PERIPHERAL DEVICE

CROSS REFERENCE PARAGRAPH FOR PRIORITY

This application is continuation of U.S. Non-Provisional application Ser. No. 16/913,391, filed on Jun. 26, 2020 and titled "SURFACE CLASSIFICATION AND SENSOR TUNING FOR A COMPUTER PERIPHERAL DEVICE," which is hereby incorporated by reference in its entirety for all purposes.

BACKGROUND

Input devices are commonplace in modern society and are typically used to convert human-induced analog inputs (e.g., touches, clicks, motions, touch gestures, button presses, scroll wheel rotations, etc.) made in conjunction with an input device into digital signals for computer processing. An input device can include any device that can provide data and control signals to a computing system. Some non-limiting examples of input devices include computer mice, keyboards, virtual reality and/or augmented reality controllers, touch pads, remote controls, gaming controllers, joysticks, trackballs, and the like. Some non-limiting examples of computing systems include desktops, laptops, tablets and "phablet" computers, smart phones, personal digital assistants, wearable devices (e.g., smart watches, glasses), virtual reality (VR) and/or augmented reality (AR) systems, and the like.

Computer mice, in particular, have undergone significant improvements in functionality, accuracy, ergonomics, and versatility. Earlier designs, including the "mechanical mouse," used a rubber ball coupled to two freely rotating rollers situated 90 degrees from one another to roll along an underlying surface. The first roller detects forward—backward motion of the mouse and the second roller detects left-right motion, with each roller sharing the same shaft as a corresponding encoder wheel with slotted edges that interrupt infra-red light beams generate electrical pulses that can be translated to wheel movement. Mechanical mice were notorious for picking up dirt, unpredictable tracking, and needing frequent disassembly and cleaning.

Contemporary mice may include optical mice using optoelectronic sensors to compare successive images of an underlying surface on which the computer mouse operates to interpret movement. Technological improvements have allowed optical mice to functionally track over varied types of surfaces (e.g., table tops, paper, glass, etc.), while avoiding some of the problems associated with mechanical mice. Optical mice typically employ light-emitting diodes (LEDs) and/or laser (e.g. coherent) light and an imaging array of photodiodes to detect movement relative to the underlying surface, which has proven to be much more reliant and robust as compared to their mechanical counterparts. Multi-surface use allows usage over a wider range of applications, which can be desirable by the average consumer. Despite these advantages, more improvements are needed for the more discerning consumers.

BRIEF SUMMARY

In certain embodiments, a computer peripheral device comprises: a housing; a communication module coupled to the housing, the communication module configured to communicatively couple the computer peripheral device with a host computer device; one or more input elements coupled to the housing, the one or more input elements configured to be actuable by a user of the computer peripheral device; an optical sensor coupled to the housing, the optical sensor configured to generate optical data corresponding to a surface that the computer peripheral device is placed upon; one or more processors coupled to the optical sensor and the housing, the one or more processors configured to: determine, based on the optical data, a relative displacement of the computer peripheral device along the surface, the relative displacement being in response to the computer peripheral device being moved along the surface by a user; identify one or more characteristics of the surface based on the optical data; compare the one or more characteristics with one or more corresponding baseline characteristics stored in memory; classify, based on the comparing of the one or more characteristics with one or more corresponding baseline characteristics, a type of the surface; and adjust, based on the classified type of the surface, an aspect of: (1) the determination of the relative displacement of the peripheral device; or (2) an operation of the optical sensor that alters the generating of the optical data. In some aspects, two different sets (e.g., a first set and a second set) of optical data are generated by the optical sensor, where the first set of optical data is used by the one or more processors for computing the relative displacement of the computer peripheral device along the surface, and where the second set of optical data is used by the one or more processors for classifying the surface. The first set of optical data and the second set of optical data can be generated at different times by a time-divisional multiplexing control schema.

In some embodiments, before a type of surface is classified, the one or more processors can be configured to determine the relative displacement of the computer peripheral device along multiple types of surfaces at a first accuracy threshold, and after the type of surface is classified, the one or more processors can be configured to determine the relative displacement of the computer peripheral device: along the classified type of surface at a second accuracy threshold that is higher than the first accuracy threshold; and along surfaces other than the classified type of surface at a range spanning from the first accuracy threshold and lower. In some embodiments, the classification of the surface type is performed dynamically depending on at least one of: a number of features per area detected by the optical sensor; or a detection of an invalid or unlikely movement. The adjusting the aspect the operation of the optical sensor may include at least one of: adjusting a current or range of an LED used by the computer peripheral device to reflect light off of the surface, wherein the optical sensor generates the optical data based on the reflected light; adjusting an exposure setting for the optical sensor; adjusting a white level setting for the optical sensor; adjusting a pixel integration time for the optical sensor; adjusting a dots-per-inch (DPI) scaling factor; adjusting an optical sensor flash rate; adjusting an optical sensor image filtering algorithm; adjusting an optical sensor displacement computation algorithm; adjusting an active pixel array position or size; or adjusting an optical sensor report rate.

In further embodiments, adjusting the aspect of the determination of the relative displacement can include at least one of: adjust a number of memory slots used to store progressively captured images generated by the optical sensor; adjust a contrast ratio used to detect surface features on the surface; adjust a threshold number of features used to detect the relative displacement; adjust a threshold contrast used to identify the surface features; adjust a threshold brightness used to identify the surface features; or adjust a threshold size used to identify the features. In some cases, the characteristics include at least one of a surface brightness or a surface contrast. The comparing can include matching a pattern stored in memory with a pattern captured from the surface using the optical sensor. In some cases, the computer peripheral device may include a plurality of stored characteristic profiles each corresponding to a respective surface type and is applied based on the classified type of surface. The computer peripheral device may include exterior lighting elements that are adjusted depending on whether a particular type of surface is currently detected.

In certain embodiments, a computer-implemented method for operating a computer peripheral device can comprise: receiving optical data from an optical sensor on the computer peripheral device, the optical data corresponding to a surface that the computer peripheral device is placed upon; determining, based on optical data, a relative displacement of the computer peripheral device along the surface, the relative displacement being in response to the computer peripheral device being moved along the surface by a user; identifying one or more characteristics of the surface based on the optical data; comparing the one or more characteristics with one or more corresponding baseline characteristics stored in memory; classifying, based on the comparing of the one or more characteristics with one or more corresponding baseline characteristics, a type of the surface; and adjusting, based on the classified type of the surface, an aspect of: (1) the determination of the relative displacement of the peripheral device; or (2) an operation of the optical sensor that alters the optical data generated by the optical sensor. In some aspects, two different sets of optical data (e.g., a first set and a second set) are generated by the optical sensor, where the first set of optical data is used by the one or more processors for computing the relative displacement of the computer peripheral device along the surface, and where the second set of optical data is used by the one or more processors for classifying the surface. The first set of optical data and the second set of optical data can be generated at different times by a time-divisional multiplexing control schema.

In certain implementations, before a type of surface is classified, the method can further include: determining the relative displacement of the computer peripheral device along multiple types of surfaces at a first accuracy threshold, and after the type of surface is classified, the method further includes: determining the relative displacement of the computer peripheral device: along the classified type of surface at a second accuracy threshold that is higher than the first accuracy threshold; and along surfaces other than the classified type of surface at a range spanning from the first accuracy threshold and lower. The classification of the surface type can be performed dynamically depending on at least one of: a number of features per area detected by the optical sensor; or a detection of an invalid or unlikely movement. In some aspects, adjusting the aspect the operation of the optical sensor includes at least one of: adjusting a current or range of an LED used by the computer peripheral device to reflect light off of the surface, wherein the optical sensor generates the optical data based on the reflected light; adjusting an exposure setting for the optical sensor; adjusting a white level setting for the optical sensor; adjusting a pixel integration time for the optical sensor; adjusting a dots-per-inch (DPI) scaling factor; adjusting an optical sensor flash rate; adjusting an optical sensor image filtering algorithm; adjusting an optical sensor displacement computation algorithm; adjusting an active pixel array position or size; or adjusting an optical sensor report rate. In some aspects, adjusting the aspect of the determination of the relative displacement includes at least one of: adjusting a number of memory slots used to store progressively captured images generated by the optical sensor; adjusting a contrast ratio used to detect surface features on the surface; adjusting a threshold number of features used to detect the relative displacement; adjusting a threshold contrast used to identify the surface features; adjusting a threshold brightness used to identify the surface features; or adjusting a threshold size used to identify the features. The characteristics can include at least one of a surface brightness or a surface contrast. The comparing may include matching a pattern stored in memory with a pattern captured from the surface using the optical sensor. The computer peripheral device may include a plurality of stored characteristic profiles each corresponding to a respective surface type and is applied based on the classified type of surface. In some cases, the computer peripheral device includes exterior lighting elements that are adjusted depending on whether a particular type of surface is currently detected.

BRIEF DESCRIPTION OF THE DRAWINGS

The features of the various embodiments described above, as well as other features and advantages of certain embodiments of the present invention will be more apparent from the following detailed description taken in conjunction with the accompanying drawings, in which:

FIG. 4A shows aspects of an input device, according to certain embodiments;

FIG. 4B shows aspects of a bottom portion of input device, according to certain embodiments;

Throughout the drawings, it should be noted that like reference numbers are typically used to depict the same or similar elements, features, and structures.

DETAILED DESCRIPTION

Figure 1:
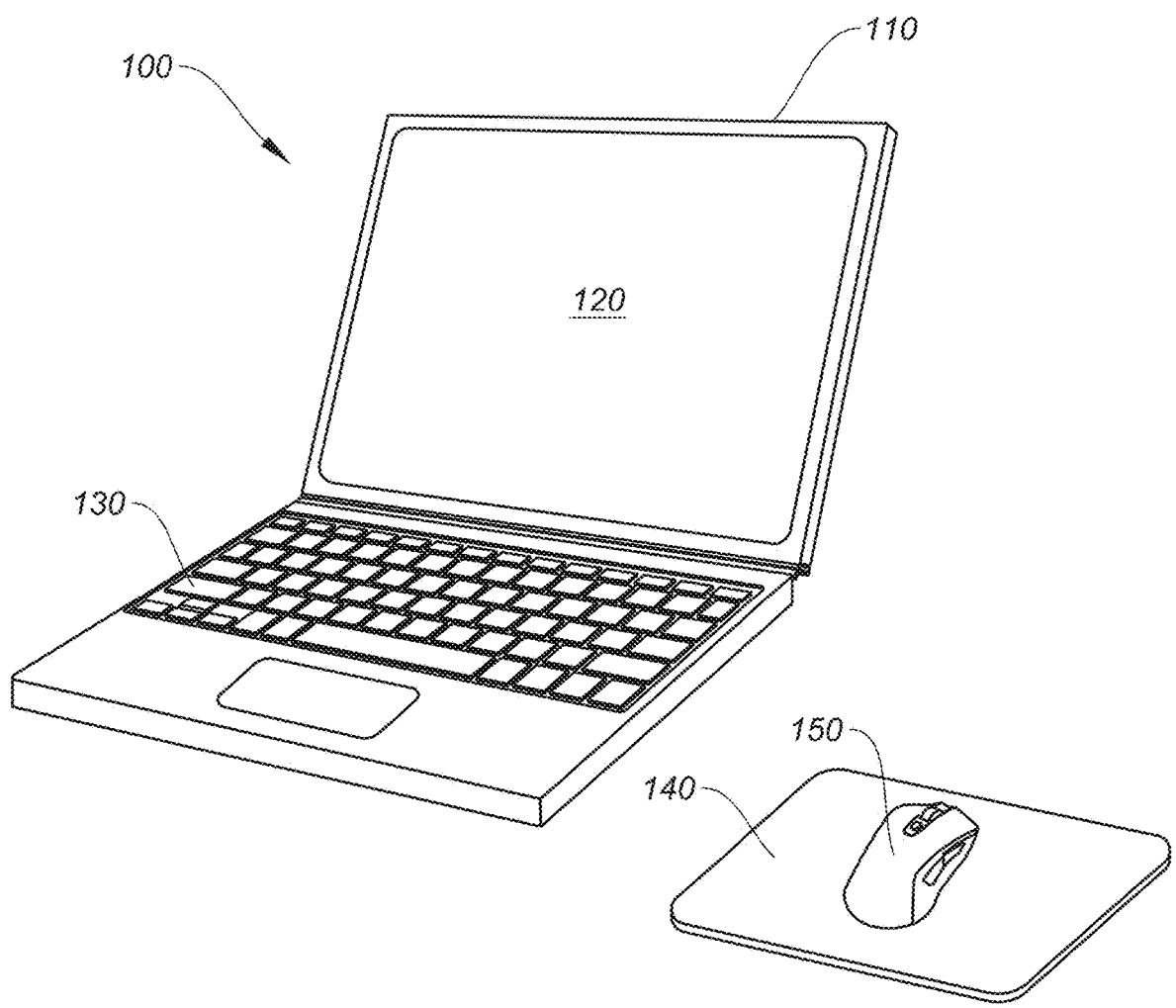
FIG. 1 shows an example of a computing system that can include any of a variety of host computing devices and peripheral devices, with peripheral devices that can be configured to perform aspects of the various inventive concepts described herein.

The present disclosure relates in general to input devices, and in particular to improved surface tracking a computer peripheral device based on a surface classification.

In the following description, various embodiments of methods and systems for improving computer peripheral device tracking accuracy on a work surface using surface classification and sensor tuning will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Optical sensors have replaced mouse balls and encoders to detect computer mouse displacement over twenty years ago, however some issues remain the same. Some of the first designs were focused on making the system improve its tracking quality, avoid jumps, glitches, drop-out, jitter, erratic/spurious motion and prevent runaway cursor movement while lifting the computer mouse. For that, significant improvements have been achieved by optimizing the optical geometry configuration, using different types of illumination light sources, increasing the number of pixels in the sensor array, and optimizing the flash rate and computing power. Early models started with red light emitting diodes (LEDs), vertical cavity surface emitting lasers (VCSEL), specular optical configurations, and more recently infra-red LEDs with specular optical configuration. Optical-based two-dimensional (2D) sensor performance can depend in large part on surface characteristics, and particularly the amount of observable features on a surface captured by the optical sensor (e.g., CMOS optical sensor) and how the system's tracking algorithm can perform correlation operations on them. Optical sensor hardware and corresponding algorithms have been optimized over the last ten years to exhibit consistent tracking on a wide range of surfaces, which presents a technical problem of limiting the sensor performance and implementing performance tradeoffs (e.g., implementing suboptimal sensor operational configurations on surfaces with high quality, easily detectable features) to accommodate the worst case tracking scenarios to ensure that tracking accuracy is maintained at a particular level across all types of surfaces, but at the cost of preventing the user from benefiting from an improved matching of optical sensor operational configurations and surface features.

Due to the modern trend of computer mouse designs catering to wide-use configurations, potential improvements in tracking for specific use cases, such as gaming and e-sports applications, have not been realized. Embodiments of the invention are directed to such improvements, which include a system that can better adjust (e.g., tune) operational parameters of the optical sensor to the physical properties and characteristics of a currently tracked surface, which can markedly improve surface tracking. To achieve this, the optical sensor and corresponding circuitry can receive information indicating a type of surface the computer mouse is operating upon with a high confidence level to avoid potentially poor performance by tuning the optical sensor to the wrong surface type. In other words, an aspect of the present invention is knowing precisely what type of surface the computer mouse is operating on so that its operational parameters can be set to tighter ranges, which can avoid wasted energy and/or mild tracking performances, as is often the case in conventional systems that have very wide settings to accommodate worst case tracking scenarios. Additionally, as a constraint of the system, a user may decide to change the surface being tracked at any time (e.g., moving the computer mouse from a mouse pad to a wooden desk). Therefore, the novel system may adapt and reconfigure its operational parameters based on a detection of a change of characteristics of a currently tracked surface. Thus, embodiments of the present invention present a technical solution by way of a computer peripheral device (e.g., computer mouse) with an optical sensor that can be dynamically optimized for any given type of surface, which eliminates the need to accommodate worst case surface characteristics with universal use and lower performing sensor tuning schemas, and can provide improved and in some cases optimal performance over a wide array of surface types.

The embodiments presented herein present many advantages. For instance, the operational configuration (the "operation") of the optical sensor can by dynamically set to match a nature of a currently used surface. Improved 2D tracking accuracy and lift-off distance detection are possible because the optical sensor can have prior information about the surface characteristics and use it to better detect changes (e.g., ones that may indicate lift-off) for a specific surface. Lift-off distance may be a distance between the optical sensor and the surface when the computer peripheral device is lifted/tilted off of the surface. In some cases, power consumption can be improved due to less waste from trade-offs in optical sensor operational settings.

In summary, embodiments of the disclosure provide systems and methods for improving input device tracking accuracy on a work surface using surface classification and sensor tuning, according to certain embodiments. These surface classification systems allow an improved tracking experience for myriad surface types by, for example, extracting surface brightness and surface contrast data to determine a surface category in order to classify them. Based on validated sets of characteristics, the system can adjust the optical sensor operational parameters to better match with the given detected surface type. The acquisition of surface parameters and optical sensor adjustment to match the surface type can be triggered automatically by the system or manually by user action (e.g., button selection, software UI, or the like). By way of example, and as further described in conjunction with FIGS. 9-11 below, some embodiments can include a computer peripheral device (e.g., a computer mouse) with an optical sensor configured to generate optical data corresponding to a surface that the computer peripheral device is placed upon. A processors can be coupled to the optical sensor and configured to determine, based on the optical data, a relative displacement of the computer peripheral device along the surface, identify one or more characteristics of the surface based on the optical data, compare the one or more characteristics with one or more corresponding baseline characteristics stored in memory, classify, based on the comparing of the one or more characteristics with one or more corresponding baseline characteristics, a type of the surface, and adjust, based on the classified type of the surface, an aspect of the determination of the relative displacement of the peripheral device or an operation of the optical sensor that alters the generating of the optical data. Further aspects of these embodiments and additional embodiments are described in further detail below.

In some embodiments, a surface type and corresponding surface identity features can be obtained from an external source, allowing the computer peripheral device to be quickly tuned to improve movement tracking on the particular surface type without requiring the rigorous computations described above. For instance, the surface type can be reported by the surface itself, e.g., by a mouse pad. FIGS. 12A-12D depict various methods of providing a surface type and corresponding surface identity values via electronic communication (e.g., wired or wireless), via encoded surface features (e.g., a QR code), via a graphical user interface, and the like.

Typical System Environment

FIG. 1 shows an example of a computer system 100 that can include any of a variety of host computing devices and computer peripheral devices, including peripheral devices (e.g., a computer mouse) that can be configured to perform aspects of the various inventive concepts described herein. Computer system 100 shows a host computing device (shown as a laptop computer) 110 and a number of peripheral devices communicatively coupled to and integrated with the host computing device, including a display device 120 and a keyboard 130. A computer mouse 150 is shown on mouse pad 140 and can be communicatively coupled to host computing device 110. For computer system 100, computer peripheral device 150 can be configured to control various aspects of computer 110 and monitor 120.

Although the host computing device is shown as a laptop computer, other types of host computing devices can be used including gaming systems, desktop computers, set top boxes, entertainment systems, a tablet or "phablet" computer, or any other suitable host computing device (e.g., smart phone, smart wearable, or the like). In some cases, multiple host computing devices may be used and one or more of the peripheral devices may be communicatively coupled to one or both of the host computing devices (e.g., a mouse may be coupled to multiple host computing devices). A host computing device may be referred to herein as a "host computer," "host device," "host computing device," "computing device," "computer," or the like, and may include a machine readable medium (not shown) configured to store computer code, such as driver software, firmware, and the like, where the computer code may be executable by one or more processors of the host computing device(s) to control aspects of the host computing device via the one or more peripheral input devices.

A typical peripheral device can include any suitable input peripheral device, output peripheral device or input/output peripheral device including those shown (e.g., a computer mouse) and not shown (e.g., game controller, remote control, wearables (e.g., gloves, watch, head mounted display), AR/VR controller, stylus device, gaming pedals/shifters, or other suitable device) that can be used to convert analog inputs into digital signals for computer processing. In some embodiments, computer peripheral device 150 can be configured to provide control signals for movement tracking (e.g., x-y movement on a planar surface, three-dimensional "in-air" movements, etc.), touch and/or gesture detection, lift detection, orientation detection (e.g., in 3 degrees-of-freedom (DOF) system, 6 DOF systems, etc.), power management capabilities, input detection (e.g., buttons, scroll wheels, etc.), output functions (e.g., LED control, haptic feedback, etc.), or any of myriad other features that can be provided by a computer peripheral device, as would be appreciated by one of ordinary skill in the art.

A computer peripheral device may be referred to as an "input device," "peripheral input device," "peripheral," or the like. The majority of the embodiments described herein generally refer to computer peripheral device 150 as a computer mouse or similar input device, however it should be understood that computer peripheral device 150 can be any suitable input/output (I/O) device (e.g., user interface device, control device, input unit, or the like) that may be adapted to utilize the novel embodiments described and contemplated herein.

A System for Operating a Computer Peripheral Device

Figure 2:
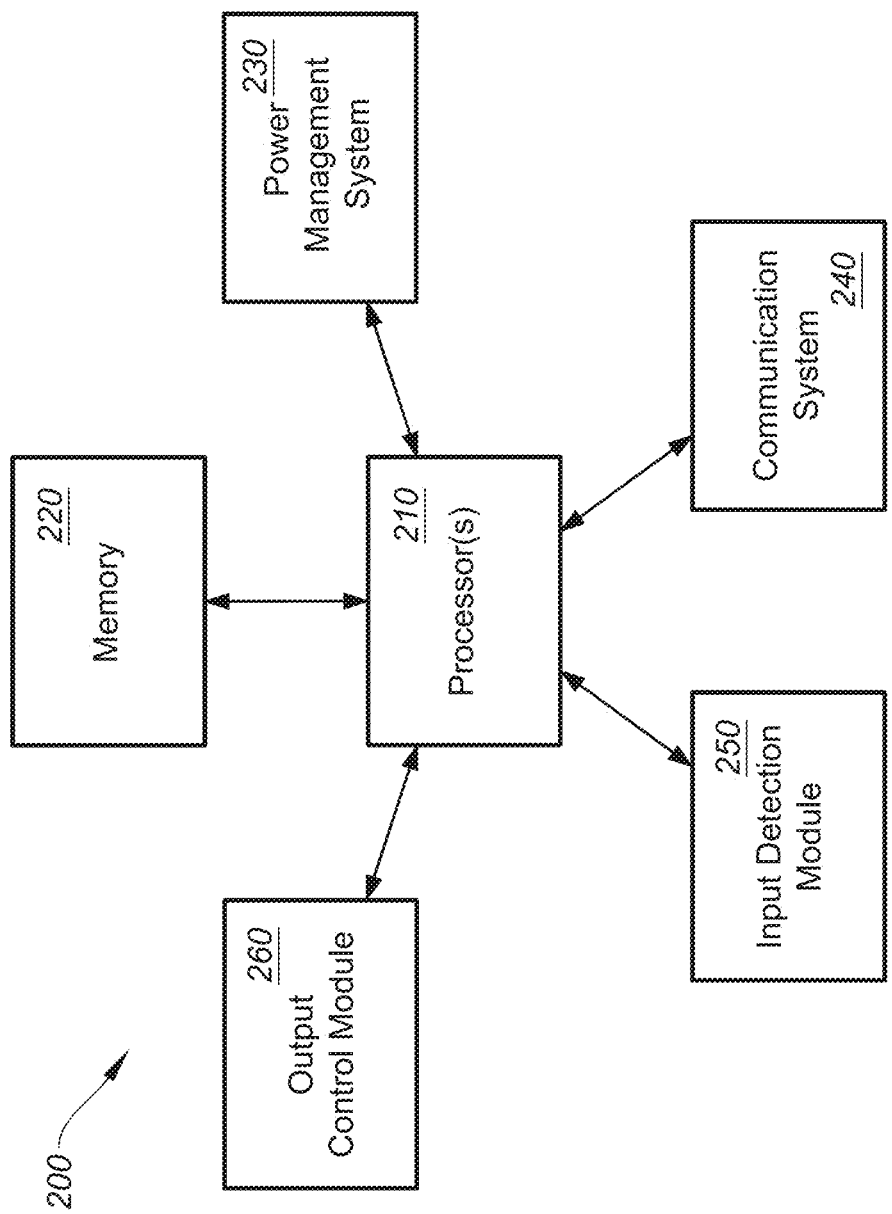
FIG. 2 shows a system for operating a peripheral input device, according to certain embodiments.

FIG. 2 shows a system 200 for operating a computer peripheral device 150, according to certain embodiments. System 200 may be configured to operate any of the computer peripheral devices specifically shown or not shown herein but within the wide purview of the present disclosure. System 200 may include processor(s) 210, memory 220, a power management system 230, a communication module 240, an input detection module 250, and an output control module 260. Each of the system blocks 220-260 can be in electronic communication with processor(s) 210 (e.g., via a bus system). System 200 may include additional functional blocks that are not shown or discussed to prevent obfuscation of the novel features described herein. System blocks 220-260 (also referred to as "modules") may be implemented as separate modules, or alternatively, more than one system block may be implemented in a single module. In the context described herein, system 200 can be incorporated into any computer peripheral device described herein and may be configured to perform any of the various methods of surface classification, optical sensor tuning, and the like, as described below at least with respect to FIGS. 9-13, as would be appreciated by one of ordinary skill in the art with the benefit of this disclosure.

In certain embodiments, processor(s) 210 may include one or more microprocessors and can be configured to control the operation of system 200. Alternatively or additionally, processor(s) 210 may include one or more microcontrollers (MCUs), digital signal processors (DSPs), or the like, with supporting hardware and/or firmware (e.g., memory, programmable I/Os, etc.), and/or software, as would be appreciated by one of ordinary skill in the art. Processor(s) 210 can control some or all aspects of the operation of computer peripheral device 150 (e.g., system block 220-260). Alternatively or additionally, some of system blocks 220-260 may include an additional dedicated processor, which may work in conjunction with processor(s) 210. For instance, MCUs, μCs, DSPs, and the like, may be configured in other system blocks of system 200. Communications block 250 may include a local processor, for instance, to control aspects of communication with computer 110 (e.g., via Bluetooth, Bluetooth LE, RF, IR, hardwire, ZigBee, Z-Wave, Logitech Unifying, or other communication protocol). Processor(s) 210 may be local to the peripheral device (e.g., contained therein), may be external to the peripheral device (e.g., off-board processing, such as by a corresponding host computing device), or a combination thereof. Processor(s) 210 may perform any of the various functions and methods (e.g., methods 900-1300) described and/or covered by this disclosure in conjunction with any other system blocks in system 200. In some implementations, processor 302 of FIG. 3 may work in conjunction with processor 210 to perform some or all of the various methods described throughout this disclosure. In some embodiments, multiple processors may enable increased performance characteristics in system 200 (e.g., speed and bandwidth), however multiple processors are not required, nor necessarily germane to the novelty of the embodiments described herein. One of ordinary skill in the art would understand the many variations, modifications, and alternative embodiments that are possible.

Memory block ("memory") 220 can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read-only memory (ROM) and/or applications stored in media storage that can be read into memory for execution by processing devices (e.g., processor(s) 210). Software can be implemented as a single program or a collection of separate programs and can be stored in non-volatile storage and copied in whole or in-part to volatile working memory during program execution. In some embodiments, memory 220 may store data corresponding to inputs on the peripheral device, such as a detected movement of the peripheral device a sensor (e.g., optical sensor, accelerometer, etc.), activation of one or more input elements (e.g., buttons, sliders, touch-sensitive regions, etc.), or the like. Stored data may be aggregated and send via reports to a host computing device.

In certain embodiments, memory 220 can store the various data described throughout this disclosure. For example, memory 220 can store and/or include optical data, surface characteristic profiles, dynamically adjustable memory pages, mouse pad product and/or surface data, classification data, look up tables for comparing and matching detected surface characteristics with known surface types, and more, as would be appreciated by one of ordinary skill in the art with the benefit of this disclosure, and as described in further detail below.

Power management system 230 can be configured to manage power distribution, recharging, power efficiency, haptic motor power control, and the like. In some embodiments, power management system 230 can include a battery (not shown), a Universal Serial Bus (USB)-based recharging system for the battery (not shown), and power management devices (e.g., voltage regulators—not shown), and a power grid within system 200 to provide power to each subsystem (e.g., communications block 240, etc.). In certain embodiments, the functions provided by power management system 230 may be incorporated into processor(s) 210. Alternatively, some embodiments may not include a dedicated power management block. For example, functional aspects of power management block 240 may be subsumed by another block (e.g., processor(s) 210) or in combination therewith. The power source can be a replaceable battery, a rechargeable energy storage device (e.g., super capacitor, Lithium Polymer Battery, NIMH NiCd), or a corded power supply. The recharging system can be an additional cable (specific for the recharging purpose) or it can use a USB connection to recharge the battery.

Communication system 240 can be configured to enable wireless communication with a corresponding host computing device (e.g., 110), or other devices and/or peripherals, according to certain embodiments. Communication system 240 can be configured to provide radio-frequency (RF), Bluetooth®, Logitech proprietary communication protocol (e.g., Unifying, Gaming Light Speed, or others), infra-red (IR), ZigBee®, Z-Wave, or other suitable communication technology to communicate with other computing devices and/or peripheral devices. System 200 may optionally comprise a hardwired connection to the corresponding host computing device. For example, computer peripheral device 130 can be configured to receive a USB, FireWire®, Thunderbolt®, or other universal-type cable to enable bi-directional electronic communication with the corresponding host computing device or other external devices. Some embodiments may utilize different types of cables or connection protocol standards to establish hardwired communication with other entities. In some aspects, communication ports (e.g., USB), power ports, etc., may be considered as part of other blocks described herein (e.g., input detection module 150, output control modules 260, etc.). In some aspects, communication system 240 can send reports generated by the processor(s) 210 (e.g., HID data, streaming or aggregated data, etc.) to a host computing device. In some cases, the reports can be generated by the processor(s) only, in conjunction with the processor(s), or other entity in system 200. Communication system 240 may incorporate one or more antennas, oscillators, etc., and may operate at any suitable frequency band (e.g., 2.4 Ghz), etc. One of ordinary skill in the art with the benefit of this disclosure would appreciate the many modifications, variations, and alternative embodiments thereof.

Input detection module 250 can control the detection of a user-interaction with input elements (also referred to as "input members" or "members") on computer peripheral device 150. For instance, input detection module 250 can detect user inputs from motion sensors, keys, buttons, roller wheels, scroll wheels, track balls, touch pads (e.g., one and/or two-dimensional touch sensitive touch pads), click wheels, dials, keypads, microphones, GUIs, touch-sensitive GUIs, image sensor based detection such as gesture detection (e.g., via webcam), audio based detection such as voice input (e.g., via microphone), or the like, as would be appreciated by one of ordinary skill in the art with the benefit of this disclosure. Alternatively, the functions of input detection module 250 can be subsumed by processor 210, or in combination therewith.

In some embodiments, input detection module 250 can detect a touch or touch gesture on one or more touch sensitive surfaces on input device 130. Input detection block 250 can include one or more touch sensitive surfaces or touch sensors. Touch sensors generally comprise sensing elements suitable to detect a signal such as direct contact, electromagnetic or electrostatic fields, or a beam of electromagnetic radiation. Touch sensors can typically detect changes in a received signal, the presence of a signal, or the absence of a signal. A touch sensor may include a source for emitting the detected signal, or the signal may be generated by a secondary source. Touch sensors may be configured to detect the presence of an object at a distance from a reference zone or point (e.g., <5 mm), contact with a reference zone or point, or a combination thereof. Certain embodiments of computer peripheral device 150 may or may not utilize touch detection or touch sensing capabilities.

Input detection block 250 can include touch and/or proximity sensing capabilities. Some examples of the types of touch/proximity sensors may include, but are not limited to, resistive sensors (e.g., standard air-gap 4-wire based, based on carbon loaded plastics which have different electrical characteristics depending on the pressure (FSR), interpolated FSR, etc.), capacitive sensors (e.g., surface capacitance, self-capacitance, mutual capacitance, etc.), optical sensors (e.g., infrared light barriers matrix, laser based diode coupled with photo-detectors that could measure the time of flight of the light path, etc.), acoustic sensors (e.g., piezo-buzzer coupled with microphones to detect the modification of a wave propagation pattern related to touch points, etc.), or the like.

Input detection module 250 may include a movement tracking sub-block that can be configured to detect a relative displacement (movement tracking) of the computer peripheral device 150. For example, input detection module 250 optical sensor(s) such as IR LEDs and an imaging array of photodiodes to detect a movement of computer peripheral device 150 relative to an underlying surface. Computer peripheral device 150 may optionally include movement tracking hardware that utilizes coherent (laser) light. In certain embodiments, an optical sensor is disposed on the bottom side of computer peripheral device 150, as shown in FIG. 4B. The movement tracking block can provide positional data (e.g., delta X and delta Y data from last sampling) or lift detection data. For example, an optical sensor can detect when a user lifts computer peripheral device 150 off of a work surface and can send that data to processor 210 for further processing. In some embodiments, processor 210, the movement tracking block (which may include an additional dedicated processor), or a combination thereof may perform some or all of the novel functions described herein, such as the tracking of the relative displacement of computer peripheral device 150 along an underlying surface.

In certain embodiments, accelerometers can be used for movement detection. Accelerometers can be electromechanical devices (e.g., micro-electromechanical systems (MEMS) devices) configured to measure acceleration forces (e.g., static and dynamic forces). One or more accelerometers can be used to detect three dimensional (3D) positioning. For example, 3D tracking can utilize a three-axis accelerometer or two two-axis accelerometers (e.g., in a "3D air mouse." Accelerometers can further determine if computer peripheral device 150 has been lifted off of a surface and provide movement data that may include the velocity, physical orientation, and acceleration of computer peripheral device 150. In some embodiments, gyroscope(s) can be used in lieu of or in conjunction with accelerometer(s) to determine movement or input device orientation.

In some embodiments, output control module 260 can control various outputs for a corresponding computer peripheral device. For instance, output control module 260 may control a number of visual output elements (e.g., mouse cursor, LEDs, LCDs), displays, audio outputs (e.g., speakers), haptic output systems, or the like. One of ordinary skill in the art with the benefit of this disclosure would appreciate the many modifications, variations, and alternative embodiments thereof.

Although certain systems may not be expressly discussed, they should be considered as part of system 200, as would be understood by one of ordinary skill in the art. For example, system 200 may include a bus system to transfer power and/or data to and from the different systems therein.

It should be appreciated that system 200 is illustrative and that variations and modifications are possible. System 200 can have other capabilities not specifically described herein. Further, while system 200 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained.

Embodiments of the present invention can be realized in a variety of apparatuses including electronic devices (e.g., peripheral devices) implemented using any combination of circuitry and software. Furthermore, aspects and/or portions of system 200 may be combined with or operated by other sub-systems as required by design. For example, input detection module 250 and/or memory 220 may operate within processor(s) 210 instead of functioning as a separate entity. In addition, the inventive concepts described herein can also be applied to any peripheral device. Further, system 200 can be applied to any of the computer peripheral devices described in the embodiments herein, whether explicitly, referentially, or tacitly described (e.g., would have been known to be applicable to a particular computer peripheral device by one of ordinary skill in the art). The foregoing embodiments are not intended to be limiting and those of ordinary skill in the art with the benefit of this disclosure would appreciate the myriad applications and possibilities.

Although certain systems may not expressly discussed, they should be considered as part of system 200, as would be understood by one of ordinary skill in the art. For example, system 200 may include a bus system to transfer power and/or data to and from the different systems therein. In some embodiments, system 200 may include a storage subsystem (not shown). A storage subsystem can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute in order to execute various operations (e.g., software-controlled spring auto-adjustment, etc.) as described herein.

It should be appreciated that system 200 is meant to be illustrative and that many variations and modifications are possible, as would be appreciated by one of ordinary skill in the art. System 200 can include other functions or capabilities that are not specifically described here (e.g., mobile phone, global positioning system (GPS), power management, one or more cameras, various connection ports for connecting external devices or accessories, etc.). While system 200 is described with reference to particular blocks (e.g., input detection block 250), it is to be understood that these blocks are defined for understanding certain embodiments of the invention and is not intended to imply that embodiments are limited to a particular physical arrangement of component parts. The individual blocks need not correspond to physically distinct components. Blocks can be configured to perform various operations, e.g., by programming a processor or providing appropriate processes, and various blocks may or may not be reconfigurable depending on how the initial configuration is obtained. Certain embodiments can be realized in a variety of apparatuses including electronic devices implemented using any combination of circuitry and software. Furthermore, aspects and/or portions of system 200 may be combined with or operated by other sub-systems as informed by design. For example, power management block 230 and/or input detection block 250 may be integrated with processor(s) 210 instead of functioning as a separate entity.

System for Operating a Host Computing Device

Figure 3:
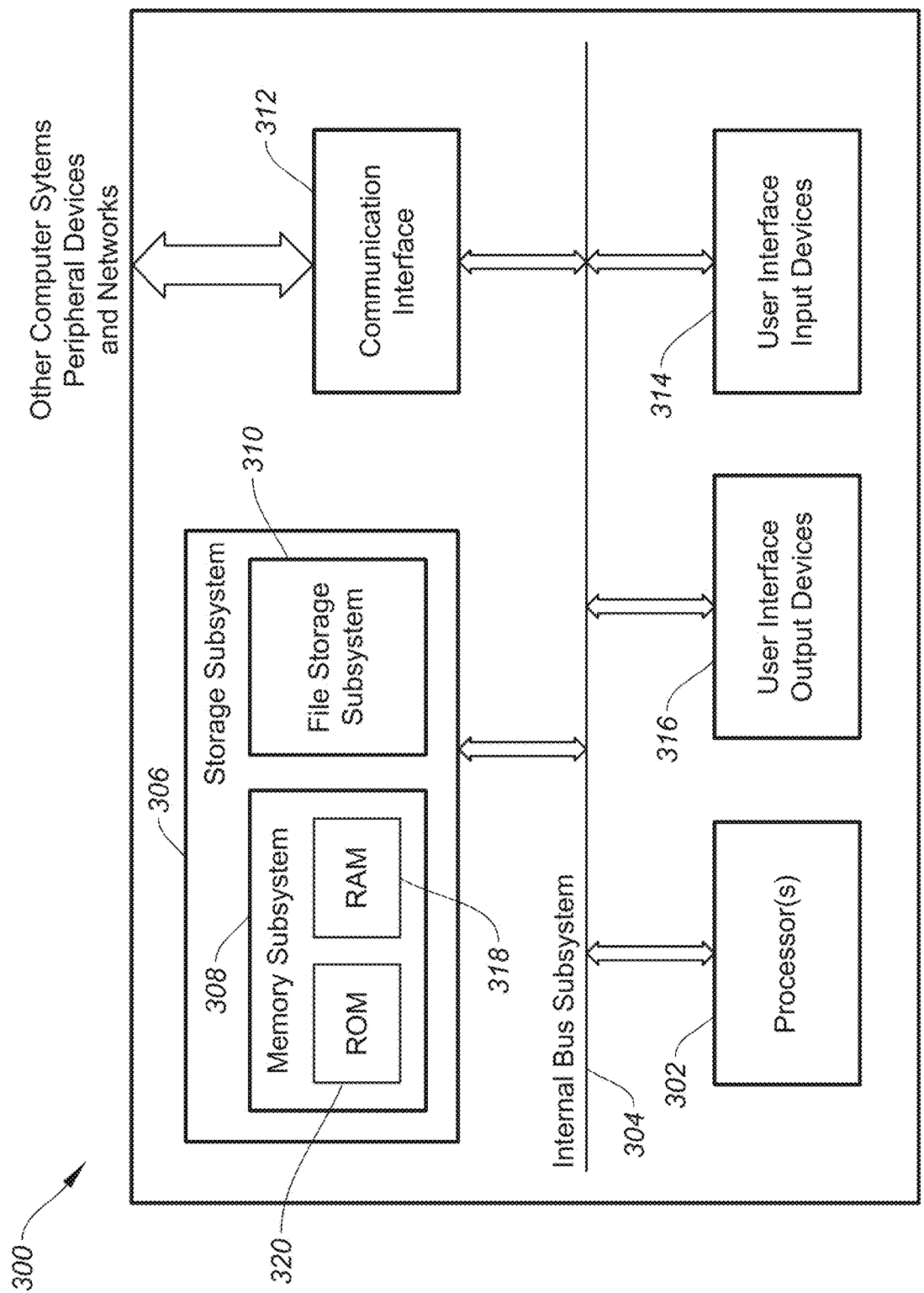
FIG. 3 is a simplified block diagram of a computing device, according to certain embodiments.

FIG. 3 is a simplified block diagram of a computing device 300, according to certain embodiments. Computing device 300 can implement some or all functions, behaviors, and/or capabilities described above that would use electronic storage or processing, as well as other functions, behaviors, or capabilities not expressly described. Computing device 300 includes a processing subsystem (processor(s)) 302, a storage subsystem 306, user interfaces 314, 316, and a communication interface 312. Computing device 300 can also include other components (not explicitly shown) such as a battery, power controllers, and other components operable to provide various enhanced capabilities. In various embodiments, computing device 300 can be implemented in a host computing device, such as a desktop or laptop computer (e.g., laptop 110), mobile device (e.g., tablet computer, smart phone, mobile phone), wearable device, media device, or the like, in peripheral devices (e.g., keyboards, etc.) in certain implementations.

Processor(s) 302 can include MCU(s), micro-processors, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of methods, functions, etc., described throughout this disclosure.

Storage subsystem 306 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include a memory subsystem 308 including random access memory (RAM) 318 such as dynamic RAM (DRAM), static RAM (SRAM), synchronous dynamic RAM (e.g., DDR), or battery backed up RAM or read-only memory (ROM) 320, or a file storage subsystem 310 that may include one or more code modules. In some embodiments, storage subsystem 306 can store one or more applications and/or operating system programs to be executed by processing subsystem 302, including programs to implement some or all operations described above that would be performed using a computer. For example, storage subsystem 306 can store one or more code modules for implementing one or more method steps described herein.

A firmware and/or software implementation may be implemented with modules (e.g., procedures, functions, and so on). A machine-readable medium tangibly embodying instructions may be used in implementing methodologies described herein. Code modules (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment (e.g., code module) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc. These descriptions of software, firmware, storage mediums, etc., apply to systems 200 and 300, as well as any other implementations within the wide purview of the present disclosure. In some embodiments, aspects of the invention (e.g., surface classification) may be performed by software stored in storage subsystem 306, stored in memory 220 of computer peripheral device 250, or both. One of ordinary skill in the art with the benefit of this disclosure would appreciate the many modifications, variations, and alternative embodiments thereof.

Implementation of the techniques, blocks, steps and means described throughout the present disclosure may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module may comprise sets of instructions (codes) embodied on a computer-readable medium that directs a processor of a computing device 110 to perform corresponding actions. The instructions may be configured to run in sequential order, in parallel (such as under different processing threads), or in a combination thereof. After loading a code module on a general purpose computer system, the general purpose computer is transformed into a special purpose computer system.

Computer programs incorporating various features described herein (e.g., in one or more code modules) may be encoded and stored on various computer readable storage media. Computer readable media encoded with the program code may be packaged with a compatible electronic device, or the program code may be provided separately from electronic devices (e.g., via Internet download or as a separately packaged computer readable storage medium).

Storage subsystem 306 can also store information useful for establishing network connections using the communication interface 312.

Computer system 300 may include user interface input devices 314 elements (e.g., touch pad, touch screen, scroll wheel, click wheel, dial, button, switch, keypad, microphone, etc.), as well as user interface output devices 316 (e.g., video screen, indicator lights, speakers, headphone jacks, virtual- or augmented-reality display, etc.), together with supporting electronics (e.g., digital to analog or analog to digital converters, signal processors, etc.). A user can operate input devices of user interface 314 to invoke the functionality of computing device 300 and can view and/or hear output from computing device 300 via output devices of user interface 316.

Processing subsystem 302 can be implemented as one or more processors (e.g., integrated circuits, one or more single core or multi core microprocessors, microcontrollers, central processing unit, graphics processing unit, etc.). In operation, processing subsystem 302 can control the operation of computing device 300. In some embodiments, processing subsystem 302 can execute a variety of programs in response to program code and can maintain multiple concurrently executing programs or processes. At a given time, some or all of a program code to be executed can reside in processing subsystem 302 and/or in storage media, such as storage subsystem 304. Through programming, processing subsystem 302 can provide various functionality for computing device 300. Processing subsystem 302 can also execute other programs to control other functions of computing device 300, including programs that may be stored in storage subsystem 304.

Communication interface (also referred to as network interface) 312 can provide voice and/or data communication capability for computing device 300. In some embodiments, communication interface 312 can include radio frequency (RF) transceiver components for accessing wireless data networks (e.g., Wi-Fi network; 3G, 4G/LTE; etc.), mobile communication technologies, components for short range wireless communication (e.g., using Bluetooth communication standards, NFC, etc.), other components, or combinations of technologies. In some embodiments, communication interface 312 can provide wired connectivity (e.g., universal serial bus (USB), Ethernet, universal asynchronous receiver/transmitter, etc.) in addition to, or in lieu of, a wireless interface. Communication interface 312 can be implemented using a combination of hardware (e.g., driver circuits, antennas, modulators/demodulators, encoders/decoders, and other analog and/or digital signal processing circuits) and software components. In some embodiments, communication interface 312 can support multiple communication channels concurrently.

User interface input devices 314 may include any suitable computer peripheral device (e.g., computer mouse, keyboard, gaming controller, remote control, stylus device, etc.), as would be appreciated by one of ordinary skill in the art with the benefit of this disclosure. User interface output devices 316 can include display devices (e.g., a monitor, television, projection device, etc.), audio devices (e.g., speakers, microphones), haptic devices, etc. Note that user interface input and output devices are shown to be a part of system 300 as an integrated system. In some cases, such as in laptop computers, this may be the case as keyboards and input elements as well as a display and output elements are integrated on the same host computing device. In some cases, the input and output devices may be separate from system 300, as shown in FIG. 1. One of ordinary skill in the art with the benefit of this disclosure would appreciate the many modifications, variations, and alternative embodiments thereof.

It will be appreciated that computing device 300 is illustrative and that variations and modifications are possible. A host computing device can have various functionality not specifically described (e.g., voice communication via cellular telephone networks) and can include components appropriate to such functionality. While the computing device 300 is described with reference to particular blocks, it is to be understood that these blocks are defined for convenience of description and are not intended to imply a particular physical arrangement of component parts. For example, processing subsystem 302, storage subsystem 306, user interfaces 314, 316, and communications interface 312 can be in one device or distributed among multiple devices. Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Host computing devices or even peripheral devices described herein can be implemented using system 300.

Examples of Features for Certain Embodiments of a Computer Peripheral Device

FIG. 4A shows aspects of a computer peripheral device 400, according to certain embodiments. Computer peripheral device 400 can include housing 410 (e.g., the "shell," "chassis," or "body" of the computer peripheral device), left button 420, right button 430, scroll wheel 440 and buttons 450, 460, as well as any other suitable input elements (e.g., additional buttons, side scroll wheels, touch sensors, etc.) or output elements (e.g., light emitting diodes (LEDs), displays, haptic feedback elements, speakers, etc.), and the like. In some cases, button 450 may be a mode selection button. For example, button 450 may be depressed to manually indicate that the computer peripheral device is being used on a different surface type. For instance, depressing button 450 may cycle through a series of surface types including gaming mouse pad, standard mouse pad, wood surface, metal surface, glass surface, etc. Alternatively or additionally, other modes of operation are possible with different performance characteristics, as would be understood by one of ordinary skill in the art. Computer peripheral device 400 may be computer mouse 150.

In some embodiments, buttons 450, 460 may be configured to switch communication between host computing devices. For instance, some embodiments may have multi-host connectivity such that computer peripheral device 400 may communication with a first host computer (e.g., a PC laptop) and switch to a second host computer (e.g., a Mac computer) in response to a corresponding button press, as further described in patent application Ser. No. 14/884,381, which is incorporated by reference in its entirety for all purposes. Alternatively or additionally, switching between hosts may be achieved by, for example, moving a corresponding cursor to an edge of a display in a "flow" enabled system, as further described in patent application Ser. No. 15/226,770 which is incorporated by reference in its entirety for all purposes. Buttons 450, 460 or any other computer peripheral devices can be configured in any suitable manner and may utilize any suitable function, which can be pre-set or user programmed (e.g., via corresponding driver software on a host computing device), as would be understood by one of ordinary skill in the art.

FIG. 4B shows aspects of a bottom portion of computer peripheral device 400, according to certain embodiments. The bottom of computer peripheral device 400 can include one or more feet 470, an image sensor 480 (e.g., CMOS sensor using an IR LED lamp), and a power switch 485. Additional input elements (e.g., buttons, sliders, etc.) may be included. In some cases, power switch 485 may be located elsewhere on the mouse or may not be included at all (e.g., computer peripheral device 400 may power up/power down based on usage). Button 495 may be a mode selection switch (e.g., switch for selecting a first mode of operation or a second mode of operation), a multi-host computer selection button, or the like. In some embodiments, button 495 may be a communication protocol selection button. For example, pressing button 495 may switch between a proprietary high-frame rate communication protocol or a lower power lower frame rate communication protocol (e.g., Bluetooth® LE). One of ordinary skill in the art with the benefit of this disclosure would understand the many variations, modifications, and alternative embodiments thereof.

In preferred embodiments, image sensor 480 is typically located near the center of the bottom portion of computer peripheral device 400, as shown. Image sensor 480 can be a single sensor, but can operate in one or multiple modes of operation (e.g., surface tracking, changing operating parameters to adapt to particular surface types and corresponding surface classifications, as further described below), according to certain embodiments. An image sensor can be a complementary metal-oxide semiconductor (CMOS) sensor that captures images of the underlying surface and sends each image to a processor (e.g., processor 210, on-board processing on the sensor, etc., to perform image correlation and displacement calculations, etc.) for analysis. Other types of image sensors may be used, including charge-coupled devices (CCD), N-type metal-oxide-semiconductors (NMOS), hybrid devices (e.g., CCD/CMOS), or the like, as would be understood by one of ordinary skill in the art. The processor can detect patterns in the images and see how those patterns have moved since the previous image, and based on changes in the patterns over a sequence of images, the processor can determine how far and what direction the corresponding computer peripheral device has moved, which can be sent to the host computer to control one or more functions (e.g., control a cursor on a display, control an audio volume in a music application, etc.). This process can occur many hundreds if not thousands of times per second to accurately detect movement of all types including a range of movement speeds and accelerations.

To illustrate some basic operational fundamentals of optical sensor-based computer peripheral devices (e.g., optical computer mice 150, 400), frame rates and memory slots are briefly described here, as they are some of the performance characteristics (among others) of a computer peripheral device that can be adjusted and optimized for a particular classified surface type, as further described below. In an optical sensor-based computer peripheral device, a "frame rate" can define a frequency at which the image sensor takes images of an underlying surface. Generally, quick movements (e.g., 20 ips or more—typical in a competitive gaming setting) with the computer peripheral device may preferably be detected using a fast frame rate (e.g., 5 kHz or more) to fully capture the movement with accuracy (e.g., how close the measurement is to the actual movement speed and/or acceleration) and precision (e.g., how repeatable an identical measurement is). Likewise, slow movements (e.g., 1-5 ips—typical with productivity software) with the computer peripheral device may be adequately detected with a slower frame rate (e.g., 1 kHz), while still achieving accuracy and precision. Higher frame rates tend to cause the computer peripheral device (e.g., system 200) to consume more power than do lower frame rates. In some cases, surface conditions can also affect power consumption. For example, surfaces with a high density of surface features (e.g., a gaming mouse pad) may be easier to track movement on as compared to surfaces with few surface features because there are more points of reference for detecting movement. Thus, a computer peripheral device operating on a surface with a low density of surface features (e.g., glass, monochromatic metal surfaces, etc.) may use more light intensity and/or a higher frame rate for a particular movement and/or acceleration than the computer peripheral device operating on a surface with a high density of surface features under the same movement and acceleration conditions.

In certain embodiments, a number of memory slots may be used to correlate movement of the input device with respect to the underlying surface. Memory slots can be used to store images taken by a pixel array in an optical sensor. Computer peripheral device 400 can use a number of memory slots to save successive image sensor images that are used to detect movement of input device 400 along an underlying surface (e.g., using input detection module 250). At minimum, two memory slots are needed to correlate movement. For instance, a first page (saved to a first memory slot) may include a surface feature or particle and a second page (saved to a second memory slot) may include the same surface feature or particle, but captured at a difference time wherein, if computer peripheral device 400 is moved, the same surface feature or particle will be located a distance from the position shown in the first page. Note that a "page" can be referred to as an "image" for purposes of this disclosure. The detected difference of location is used to interpolate a movement of the input device with respect to the underlying surface, as would be understood by one of ordinary skill in the art. "Memory slots" may be interchangeably referred to as "memory blocks," (not to be confused with memory "block" 220) "memory pages," "memory cells," and the like. The memory slots may be part of and/or controlled by processor 210, input detection module 250, or a combination thereof. In some cases, memory slots may be stored on external memory (e.g., external to processor 210 and/or movement tracking block 230) and controlled by one or more resources of system 200. In certain embodiments, the memory slots are stored on the image sensor silicon and may be controlled by image sensor 480, processor 210, or a combination thereof. In some cases, the image sensor can be subsumed, wholly or in part, by input detection module 250. One of ordinary skill in the art would understand the many variations, modifications, and alternative embodiments thereof.

Additional memory slots may be used to better correlate movement for improved accuracy. For example, some images may include noise or other interference. In such cases, having an additional memory slot to capture an earlier image may be useful as it can provide another set of data points to correlate a detected movement. Generally, more memory slots can provide better correlation and thus improved accuracy. However, having additional memory slots (e.g., 3 or more) typically requires additional computational resources as more data (additional memory pages) are analyzed and correlated with the other memory pages.

Higher performance settings can typically benefit more from additional memory pages as they can further support the accurate detection of fast movements and/or accelerations of the input device. In some exemplary embodiments, computer peripheral device 400 can include four or more memory slots when placed in the a high performance mode of operation. However, more or fewer memory slots may be used, as would be understood by one of ordinary skill in the art. Furthermore, the number of memory slots used may depend on a detected surface type, as further described below. For example, fewer memory slots may be needed when a detected surface type is a mouse pad, as they typically include a high density of surface features with good surface brightness and surface contrast and is thus easier to track relative motion of the computer peripheral device along the surface. More memory slots may still be used for enhanced performance conditions. Conversely, surfaces with a low density of features with poor surface brightness and surface contrast may require more memory slots to allow for more opportunities for correlation.

In certain embodiments, memory slots may be integrated with the optical sensor itself, or may be realized in any combination of memory stored at the optical sensor (e.g., memory slots, on-board flash memory, etc.), memory block 220, memory subsystem 308, or any combination thereof. In some embodiments, the memory slots can store surface identity vectors (e.g., physical properties of the surface, also referred to as characteristics), such as a reference image of the surface, woven patterns, feature spatial frequency pitch, surface feature shape and arrangement, and more, as well as real-time estimators of these surface properties to validate that the sensor is still being used on what they system considers the current surface in use. These memory slots can operate to speed-up surface recognition and responsiveness of the sensor parameter tuning. A non-exhaustive lift of surface properties discussed throughout the present disclosure may include brightness, contrast, features density, mean size of features, feature size standard deviation, temporal variation of brightness, temporal variation of contrast, temporal variation of a number of features, peak gradient (e.g., first derivative, edge), peak Laplacian (e.g., second derivative, peaks and dips), pattern repetitiveness, amount of line features, illumination of spot center, shape of illumination roll-off, and more, as would be appreciated by one of ordinary skill in the art with the benefit of this disclosure.

Surface Classification and Tuning an Optical Sensor for Improving Surface Tracking The systems and methods of surface classification described herein allow for a significantly improved computer peripheral device displacement tracking performance over a wide variety of surfaces. At a high level of description, surfaces can be classified based on a number of characteristics including surface brightness, surface contrast, and a density of surface features. Based on verified sets of surface characteristics, optical sensor operational parameters can be adjusted and tuned for improved matching, or in some cases ideal matching, with a detected surface classification (the surface type). This presents a clear technical advantage over existing designs having fixed optical sensor parametric settings configured to accommodate worst case tracking scenarios in order to ensure that the optical sensor will be capable of tracking at a baseline accuracy level over both good surface types (e.g., high brightness, contrast, and density of surface features) and poor surface types (e.g., low brightness, contrast, and density of surface features). However, these types of design tradeoffs will result in sensor configurations that are sub-optimal on surfaces with high quality features (e.g., gaming mouse pads), which will prevent the user from benefiting from an improved match of the sensor configuration with the detected surface type that can result in a markedly improved tracking performance, in addition to performance enhancements in lift off detection (e.g., the sensor has prior information the surface characteristics of the surface and can adapt lift detection algorithms accordingly), and power consumption (e.g., less inefficiency due to trade-off sensor parametric settings).

In some embodiments, the determination of surface characteristics and the adjustment of the operational parameters of the optical sensor can be an automated process (e.g., see FIGS. 9-10), or it can be triggered by a user action (e.g., user presses a button on the computer peripheral device or selects a surface type on a graphical user interface).

Surface Types and Characteristics

As indicated above, there are a variety of common surface types that users tend to use when operating a computer peripheral device such as a computer mouse. Some common surfaces may include various types of mouse pads, tables, desks, arm rests, stationary (e.g., folders), books, or the like, with each having any of an array of different materials, textures, coatings, etc. Each type of surface can have different surface characteristics, including a surface brightness (e.g., darkness versus brightness), surface contrast (e.g., diffuse versus specular), and a density of surface features. Surface features may include patterns, surface feature spatial frequency pitch, surface feature shape and arrangement, or the like. Some non-limiting examples of surface types and their corresponding surface characteristics are discussed at least with respect to FIGS. 5-8. Some aspects of surface brightness and surface contrast are presented below.

Any suitable method may be used to determine a surface brightness of a surface. In some embodiments, surface brightness can be estimated based on an LED Current (ILED) and the Integration Time (IT) for the image sensor circuit. The Radiant Intensity (W/sr) of the LED can be estimated based on the value of the LED current set by either a sensor register, external circuitry, or chosen resistor. The Irradiance Flux Density (W/m2) on the surface (e.g., mouse pad) can also be estimated based on the value of the LED Current register, LED efficiency, and the sensor geometry, for example. The Radiosity (W/m2) leaving the surface is dependent on the Surface Brightness and can be inversely related to the Integration Time of the sensor. Therefore, the Surface Brightness can be estimated as a function of the LED Current (ILED) and the Integration Time (IT). In an example embodiment, ILED may be between 0.5 mA and 56 mA, and IT may be between 5 μs-512 μs, although other ranges are possible. This is one particular method of estimating the surface brightness of a surface. Other methods of estimating a surface brightness may be used, as would be appreciated by one of ordinary skill in the art with the benefit of this disclosure.

Any suitable method may be used to determine a surface contrast of a surface. In some embodiments, the contrast could be estimated using image dump. In further embodiments, a Tri-State Threshold (TST) parameter can be used. During the computation of X and Y edge maps, the TST can be used to remove pixels from edge maps that do not have a strong enough gradient. On surfaces with a high contrast, increasing the TST value may not significantly affect the number of edge pixels in the edge maps. On surfaces with a low contrast, increasing the TST value may reduce the number edge pixels in the edge maps rapidly. Thus, changing the TST value and comparing the number of edges before and after can give relevant information regarding the surface contrast, as would be appreciated by one of ordinary skill in the art with the benefit of this disclosure. In some aspects, measuring the level of surface image gradient (e.g., 1st derivative) and/or the level of surface image Laplacian (e.g., 2nd derivative) can also be used to determine the surface contrast.

Typically, surface brightness information can be used to classify a surface, however in some embodiments the surface brightness may not be used in tuning sensor parameters as it is already considered in the sensor feedback loop at the silicon level (e.g., ILED and IT). The surface contrast is typically used to determine if a surface can have robust tracking, and sensor parameter tuning is often based solely on the surface contrast alone, however some embodiments may employ other surface characteristics for parameter tuning. However, the surface brightness can help determine if the surface has changed or not, as further discussed below. In certain embodiments, any number of surface properties can be used in the process. In exemplary embodiments, an order of importance may include contrast, feature density, features size (e.g., mean and standard deviation), brightness, and temporal variation, however it would be understood by one of ordinary skill in the art that any order and combination is possible.

Figure 5:
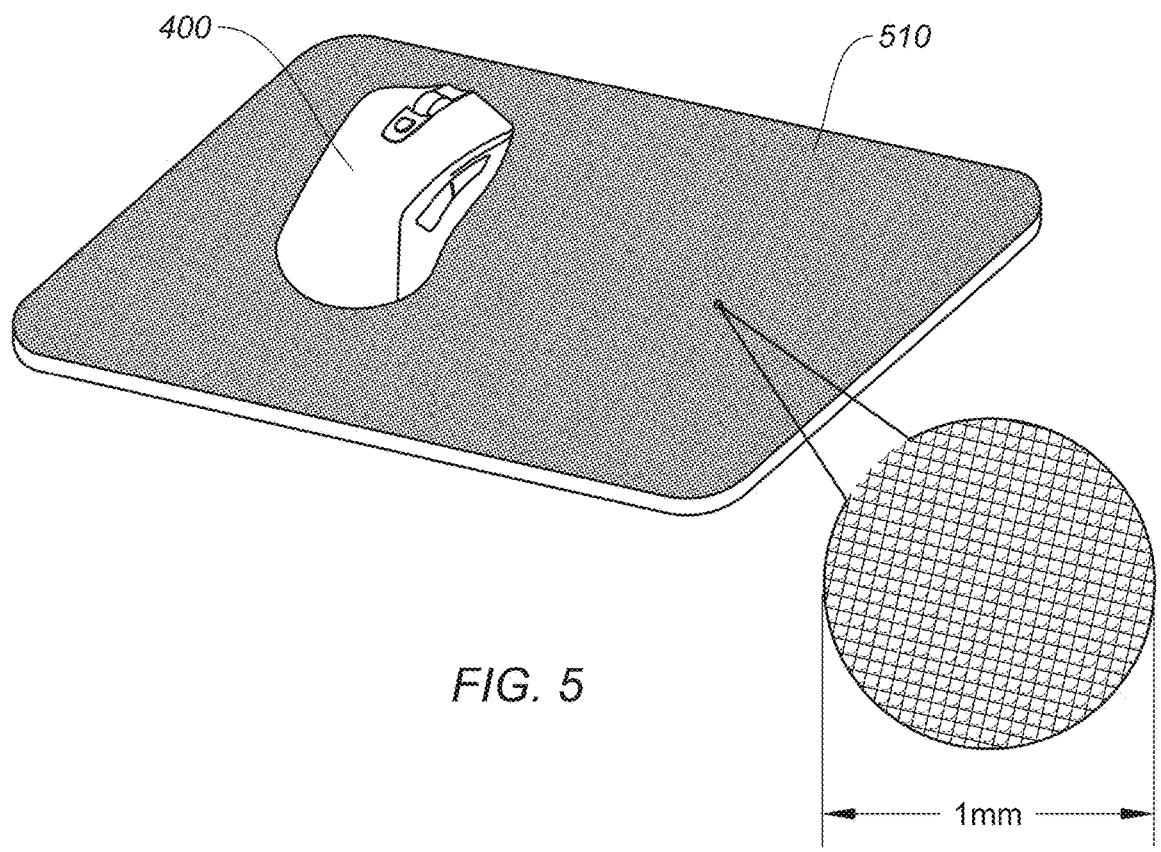
FIG. 5 shows an input device operating on a mouse pad, according to certain embodiments.

FIG. 5 shows a computer peripheral device 400 operating on a mouse pad 510, according to certain embodiments. Mouse pads typically have excellent surface characteristics including high surface contrast and a high number (e.g., density) of surface features, as summarized in Table 800 of FIG. 8 that shows various properties of surfaces that can affect movement tracking accuracy for a computer peripheral device. FIG. 5 includes a zoomed portion of mouse pad 510 that shows a dense, repeating pattern of cells with nearly ideal surface characteristics. Computer peripheral device 400 may be tuned to these surface characteristics for very high performance tracking, as further described below.

Mouse pads are typically made of low density rubber composites (e.g., open-cell styrene, butadiene rubber, styrene-butadiene rubber, etc.) with a fabric coupled to the upper surface of the rubber composite. However, other types of material can be used for both the body or surface including various fabrics, plastics, recycled rubber tires, neoprene, silicone rubber, leather, glass, cork, wood, aluminum, stone, stainless steel, or the like, with each having their own particular surface characteristics. Some of the best mouse pads are often gaming mats, which are typically comprised of plastic, textured glass (with good surface characteristics), aluminum, or carbon fiber.

Figure 6:
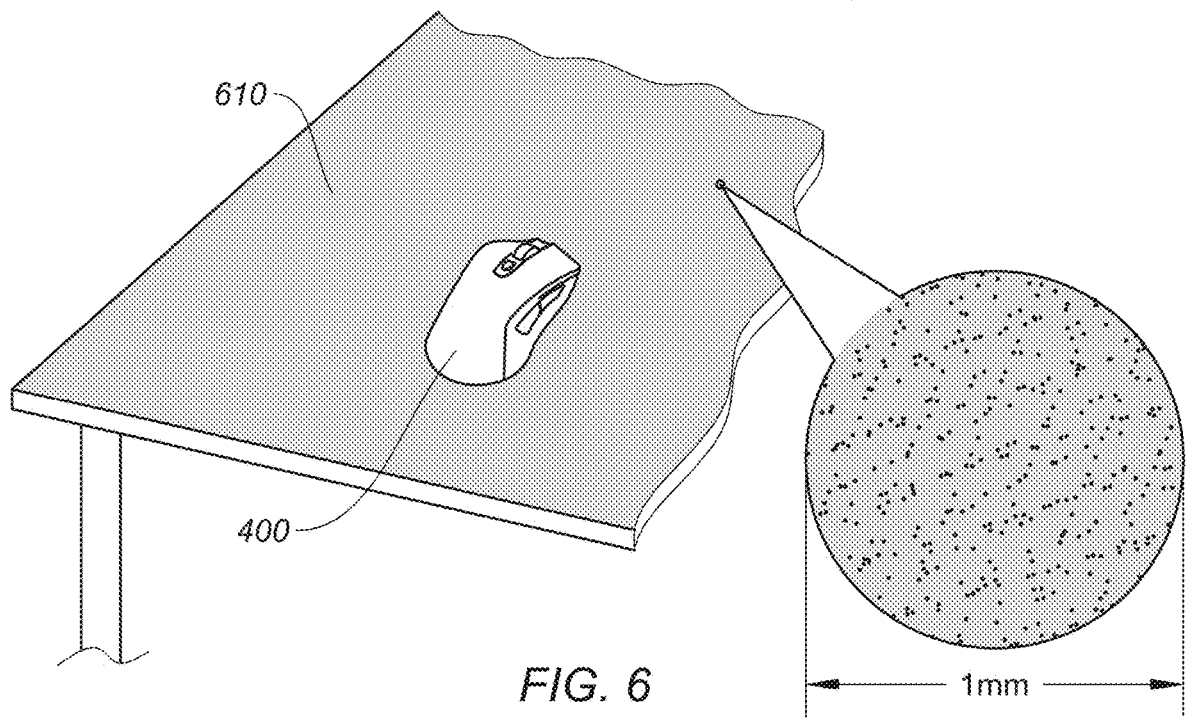
FIG. 6 shows an input device operating on a wooden table, according to certain embodiments.

FIG. 6 shows computer peripheral device 400 operating on a desk 610 with a plain surface, according to certain embodiments. Desk surfaces may often have low surface contrast and a medium number of surface features, as summarized in Table 800. FIG. 6 includes a zoomed portion of desk 610 that shows a moderately dense, random pattern of surface features (e.g., imperfections, etc.) with medium quality surface characteristics. Computer peripheral device 400 may be tuned to these surface characteristics for improved tracking on this particular type of surface, as further described below.

Figures 7, 8:
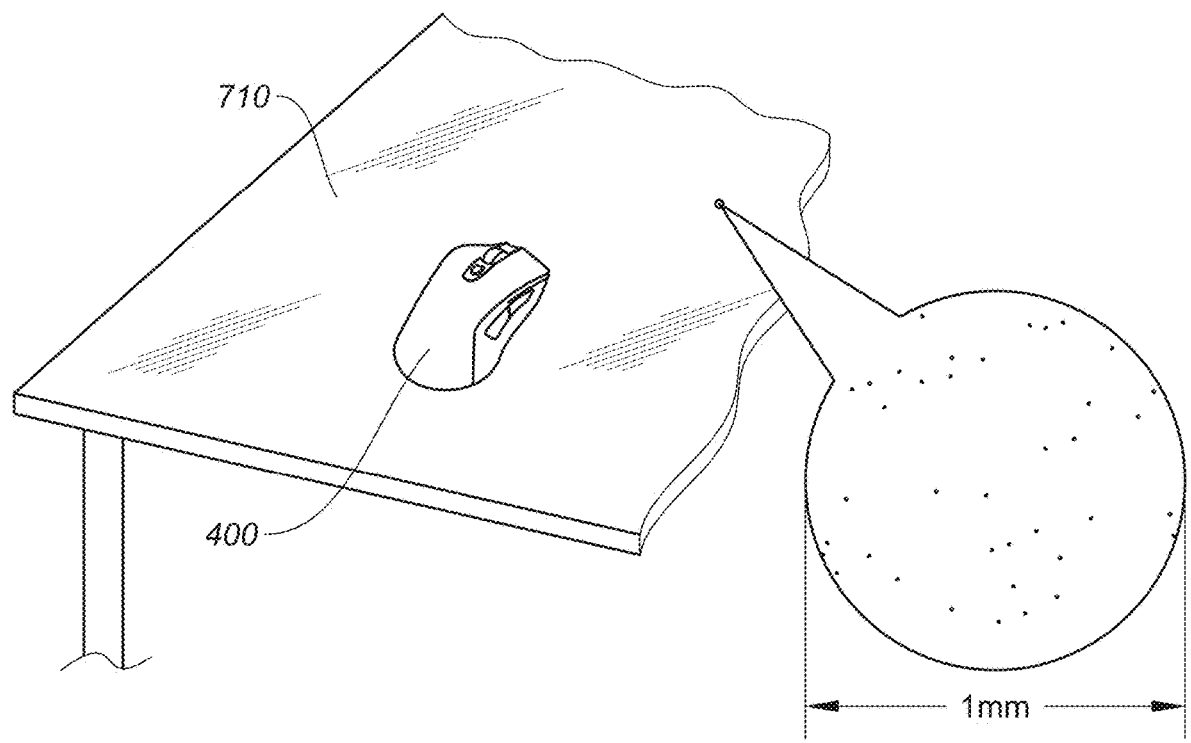
FIG. 7 shows an input device operating on a glass table, according to certain embodiments.
FIG. 8 is a chart showing various properties of the underlying surface that can affect movement tracking accuracy for an input device, according to certain embodiments.

FIG. 7 shows computer peripheral device 400 operating on a glass table 710, according to certain embodiments. Glass surfaces may often have a very low surface contrast and a very low number of surface features, as summarized in Table 800. FIG. 7 includes a zoomed portion of table 710 that shows a sparsely distributed, random pattern of surface features (e.g., specks, microscopic debris, etc.) with very low quality surface characteristics. Computer peripheral device 400 may be tuned to these surface characteristics, despite the low quality, to achieve improved tracking performance, as further described below.

Figure 9:
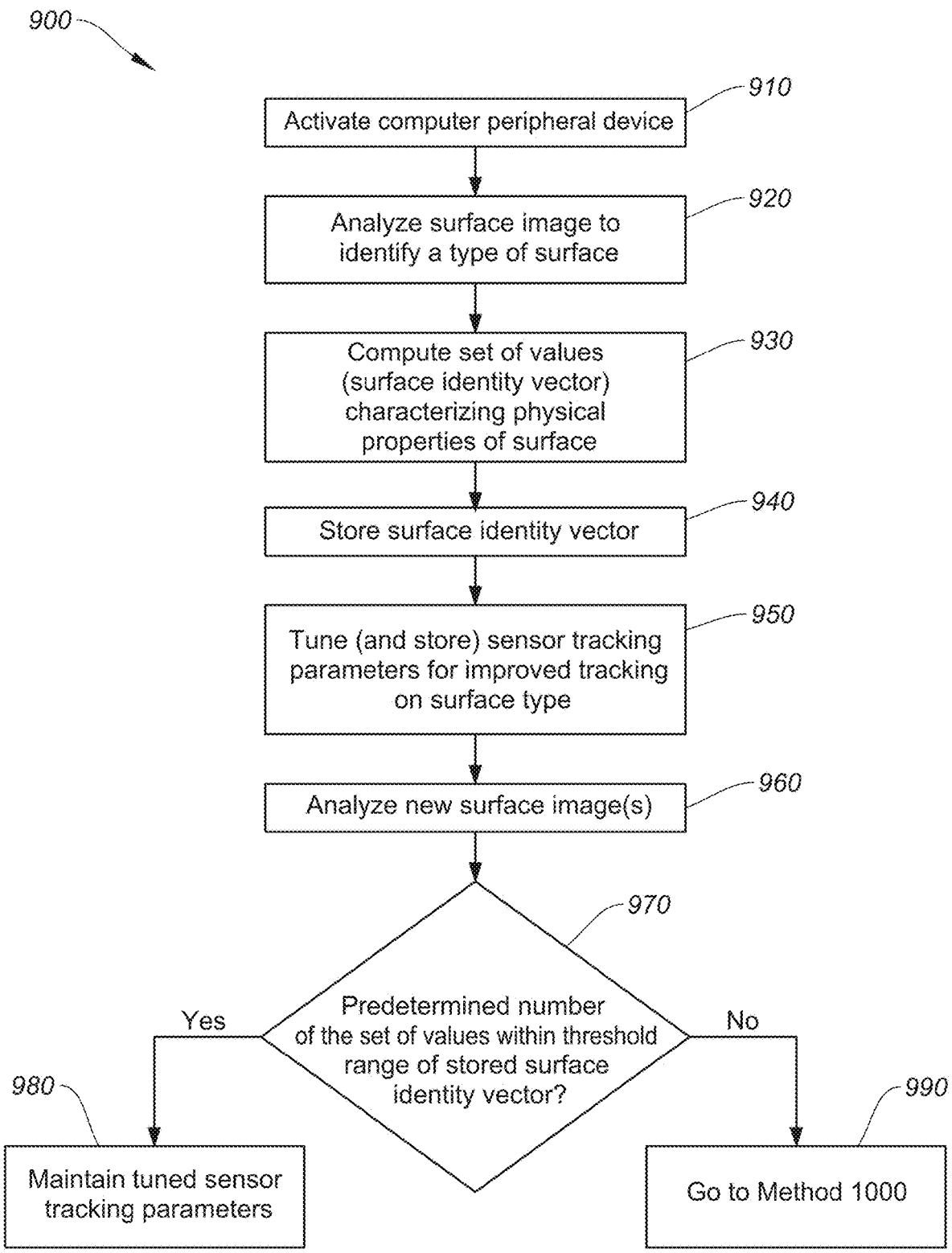
FIG. 9 is a simplified flow chart showing aspects of a method for improving computer peripheral device tracking accuracy on a work surface using surface classification and sensor tuning, according to certain embodiments.

FIG. 9 is a simplified flow chart showing aspects of a method 900 for improving computer peripheral device tracking accuracy on a work surface using surface classification and sensor tuning, according to certain embodiments. Method 900 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 900 can be performed by aspects of processor(s) 210, memory 220, input detection module 250 (e.g., controlling aspects of optical sensor 480), or any combination thereof.

At operation 910, method 900 can include activating computer peripheral device 400, according to certain embodiments. Activation can include turning on from an off state or from a sleep mode, transitioning from a lifted mode to a non-lifted mode, or the like. Any suitable method of activation may be used, which typically occurs when the computer peripheral device is ready to begin tracking its displacement along a surface.

At operation 920, method 900 can include analyzing one or more surface images to identify the surface type of an underlying surface, according to certain embodiments. For instance, processor(s) 220 can run a surface classifier program to analyze one or more images and/or edge maps of the surface to determine the surface type. Optical sensor 480 can generate the optical data (e.g., the one or more surface images) corresponding to the surface that the computer peripheral device is placed upon.

At operation 930, method 900 can include computing a set of identity values (the surface identity vector) that characterizes physical properties of the surface, according to certain embodiments. Each of the set of surface identity values can also be referred to as "characteristics" or "properties" of the surface. Some of the physical properties of the surface can include a surface brightness, a surface contrast, and a number of surface features, among other characteristics (e.g., frequency of pixel voltage distribution such as a histogram revealing "trackability" of a surface, etc.). A more extensive, non-exhaustive list is described above.

At operation 940, method 900 can include storing the surface identity vector in memory, according to certain embodiments. In some cases, the computer peripheral device could store a reference image and/or edge map of the current surface in memory 220 and/or on-board memory of optical sensor 480.

At operation 950, method 900 can include tuning and storing sensor tracking parameters for improved tracking on the computed surface type (defined by the surface identity vector), according to certain embodiments. The sensor tracking parameters are tuned and stored in order to operate in a known operating condition. For example, the sensor tracking parameters of the optical sensor are tuned to improve (in some cases optimize) relative displacement tracking on the particular surface based on the surface identity vector. The optimized settings can be stored as "profiles" so that when the same surface is encountered in the future, the corresponding profile can quickly and automatically tune the optical sensor without running a computationally expensive tuning process. Some of the sensor tracking parameters include LED current, pixel integration time, pixel noise filtering threshold, flash rate, flash strategy, correlation threshold, correlation strategy, choice of sub-pixel computation methodology, lift-detection algorithm (e.g., for detecting when the mouse has been physically lifted or tilted from an underlying surface such that there is a larger air gap between the two. In response, the mouse may stop tracking or adjust its tracking to account for the increased distance.), lift detection threshold, dots-per-inch (DPI) fine tuning, and the like.

At operation 960, method 900 can include analyzing new surface images, according to certain embodiments. For instance, real-time estimators of some or all surface "identity" values may be run at every frame or at every N frames of the image sensor (e.g., every 5 frames). In some embodiments, a real-time estimator can be a fast process (e.g., using hardware and/or software) to compute some of the surface identify values (e.g., contrast, feature density, etc.). In some aspects, a surface classifier program may include a process to computer most or all surface identity values, determine a type of surface based on those values, store the most relevant and quick-to-compute surface identity values (e.g., the values that can be checked in the real-time estimator process), and set all sensor parameter for an optimal tracking on the type of surface.

At operation 970, method 900 can include determining whether a predetermined number of the set of values (the surface identity vector) stay within a threshold range of the surface identity vector stored in the optical sensor, according to certain embodiments. When the subsequent predetermined surface identity values (e.g., LED current, pixel integration time, pixel noise filtering threshold, number of high gradient pixels, number of high gradient pixels remaining after applying digital filters (e.g., morphological filters), etc.) change but stay within a threshold range, the optical sensor maintains its current sensor tracking parameter settings (operation 980) until the next time the surface identity values are evaluated (e.g., operations 960 and 970 may be iterated). Any suitable threshold range for each surface identity value can be used (e.g., surface identity value stays within 5% of initial measured value), as would be appreciated by one of ordinary skill in the art with the benefit of this disclosure. When the predetermined set of surface identity values fall out of the threshold range, or if a lift detection is triggered, method 900 can continue to method 1000 (operation 990).

It should be appreciated that the specific steps illustrated in FIG. 9 provide a particular method 900 for improving computer peripheral device tracking accuracy on a work surface using surface classification and sensor tuning, according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Figure 10:
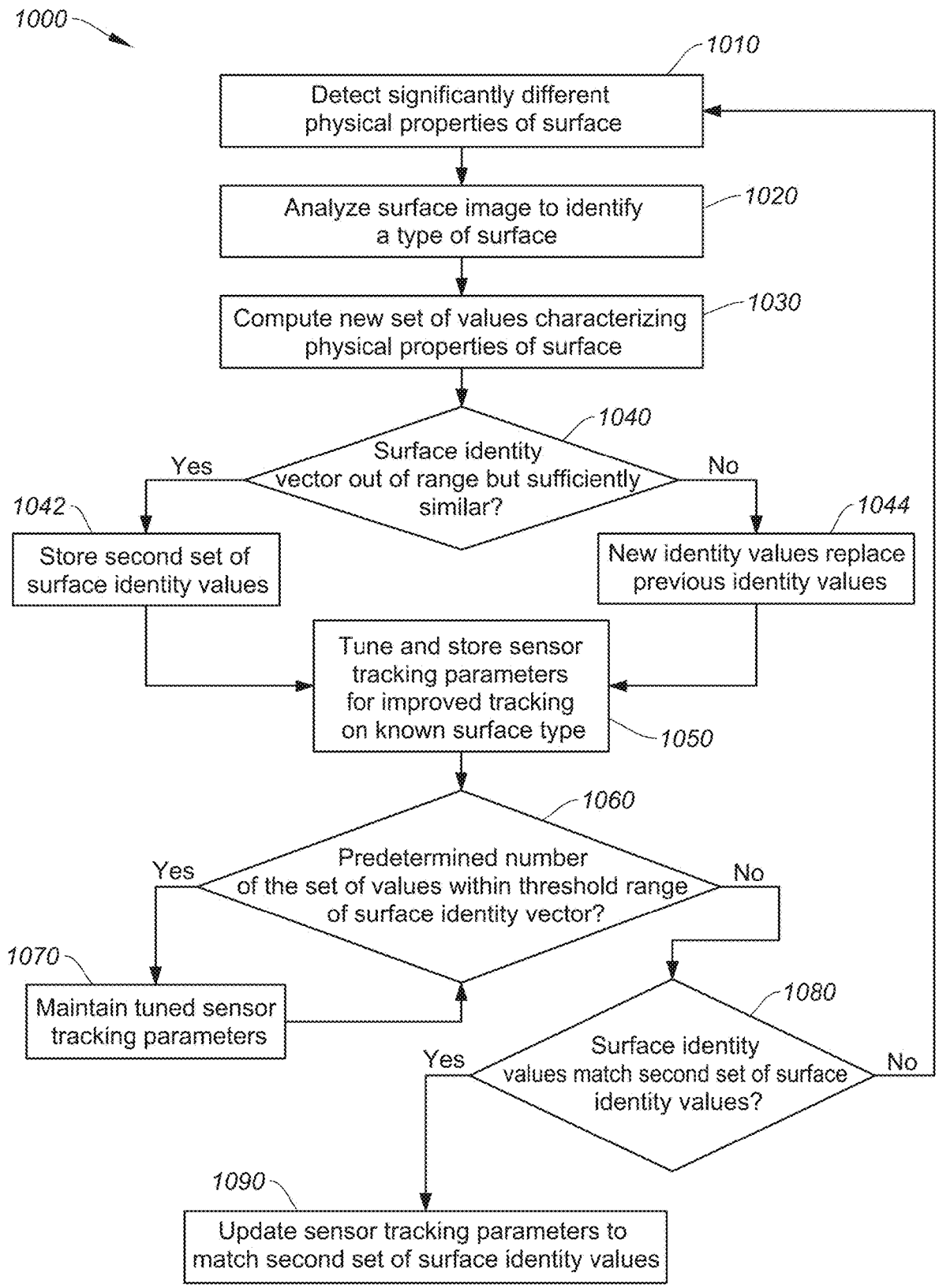
FIG. 10 is a simplified flow chart showing aspects of another method for improving computer peripheral device tracking accuracy on a work surface using surface classification and sensor tuning, according to certain embodiments.

FIG. 10 is a simplified flow chart showing aspects of a method 1000 for improving computer peripheral device tracking accuracy on a work surface using surface classification and sensor tuning, according to certain embodiments. Method 1000 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 1000 can be performed by aspects of processor(s) 210, memory 220, input detection module 250 (e.g., controlling aspects of optical sensor 480), or any combination thereof.

At operation 1010, method 1000 can include detecting a significantly different physical properties of an underlying surface, according to certain embodiments. This may occur if a user has moved the computer peripheral device from one surface to another that has markedly different physical properties.

At operation 1020, method 1000 can include re-analyzing an image surface and/or edge maps with a surface classifier to identify the underlying surface type, according to certain embodiments.

At operation 1030, method 1000 can include computing a new set of surface identity values (the new surface identity vector) to characterize physical properties of the underlying surface, according to certain embodiments.

At operation 1040, method 1000 can include determining whether the surface identity vector (the surface identity values) are out of range but sufficiently similar to currently stored value, according to certain embodiments. If the surface identity values are out of range, but sufficiently similar, a second set of surface identity values (the out-of-range surface identity values) can be stored in parallel to the current surface identity values so that the system can quickly switch between the two sets of surface identity values (operation 1042). In some cases, a surface identity vector may cause relatively frequent updating between the two surface identity values because they are similar. In such cases, a two threshold approach (one for each set of values) can be used to implement a hysteresis to prevent frequent switching between the two and to better stabilize the system, as would be appreciated by one of ordinary skill in the art with the benefit of this disclosure. If the surface identity values are different enough from the currently stored values, the newly computed surface identity values are stored in replacement of the previous surface identity values (operation 1044).

At operation 1050, method 1000 can include tuning sensor tracking parameters for improved tracking on a known surface identity, according to certain embodiments. The tuned sensor tracking parameters may be stored (e.g., in on-board sensor flash memory) and recalled when the same surface type is later identified.

At operation 1060, method 1000 can include determining whether a predetermined number of the set of surface identity values are within a threshold range, according to certain embodiments. Real-time estimators of some or all of the surface identity values can be run at every frame, at every N frames, or other frequency of frame analysis of the optical sensor. When the subsequent predetermined surface identity values (e.g., LED current, pixel integration time, pixel noise filtering threshold, etc.) change but stay within a threshold range, the optical sensor maintains its current sensor tracking parameter settings (operation 1070) until the next time the surface identity values are evaluated (e.g., operations 1060 and 1070 may be iterated). Any suitable threshold range for each surface identity value can be used (e.g., surface identity value stays within 5% of initial measured value), as would be appreciated by one of ordinary skill in the art with the benefit of this disclosure. If the newly measured predetermined set of surface identity values fall out of the threshold range, but match the second set of surface identity values (operation 1080), then the current sensor tracking parameters can be updated to match the stored second set of surface identity values from operation 1042 (operation 1090). If the newly measured predetermined set of surface identity values does not match the second set of surface identity values, or if a lift detection is triggered, the method may return to operation 1010.

It should be appreciated that the specific steps illustrated in FIG. 10 provide a particular method 1000 for improving computer peripheral device tracking accuracy on a work surface using surface classification and sensor tuning, according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

In addition to the benefits provided by improving a surface tracking performance by optimizing an optical sensor to a particular surface type, other sensor operations can be positively benefitted from these optimizations. For instance, tracking responsiveness and stability may be positively affected as knowing which type of surface features will be detected (e.g., knowing the surface type) can be leveraged to help ignore or reduce the deleterious effects of noise and to better identify when actual motion begins. DPI accuracy can be improved as each surface type can have a unique set of characteristics (surface identity values) that can positively or negatively affect DPI response. Knowing what the surface identity values are can help to better lock to a pitch or pattern of the surface type. DPI vs. angle accuracy may be improved. Assuming that the surface has a pattern, it would be possible to compensate tracking for changes in orientation, e.g., a cloth surface bunches or folds, wood surface with oriented veins, etc. Lift detection accuracy can be improved due the novel system and methods presented herein. For example, different surface types may offset a spot (LED illumination) center position. Knowing the particular contours of the surface and how it affect the spot center position can help the computer peripheral device determine what is nominal and what is more likely a lift event. In some aspects, lift compensation can be improved as a result of surface classification. For instance, knowing a location of a spot versus the height of a given surface could help the system to compensate for a magnification change and keep reporting a same DPI. Further, power consumption can be improved with surface classification. Knowing a surface type can allow the system to tighten or relax power requirements to ensure good operation with reduced wasted power typically associated with worst case scenario tracking, as noted above.

Any number of sensor tracking parameters can be affected when tuning an optical sensor to operate on a particular surface type. Some sensor tracking parameters were described above with respect to FIGS. 9-10, however many other sensor tracking parameters can be adjusted to optimize tracking on a particular surface type, including but not limited to a sensor exposure threshold, exposure time value and/or range (pixel integration time), LED current and/or range, illumination gradient filtering and/or correction, flash rate range, flash rate strategy (e.g., down-shift, rest mode rate, burst flash mode, etc.), front end-to-logic conversion threshold (e.g., analog-to-digital), pixel noise filtering threshold, image and/or edge map filtering, correlation window position, correlation window size, correlation peak threshold, correlation strategy, choice of sub-pixel computation algorithm, image and/or edge map memory number, image and/or edge map memory strategy, DPI scaling factor, trajectory compensation, lift detection algorithm, lift detection threshold, illumination spot position (range), active pixel array position, active pixel array size, predefined sensor mode (e.g., gaming or office performance modes), sensor-to-mouse report rate, computer peripheral device-to-PC report rate, and more, as would be appreciated by one of ordinary skill in the art with the benefit of this disclosure.

By way of example, some exemplary embodiments that fall within the purview of the various embodiments described above (e.g., methods 900, 1000) may include a computer peripheral device (e.g., a computer mouse) comprising a housing (e.g., a computer mouse chassis, shell, etc.), a communication module coupled to the housing and configured to communicatively couple the computer peripheral device with a host computer device (e.g., via Bluetooth; Wi-Fi, NFC, RF, etc.), one or more input elements (e.g., buttons, scroll wheel, etc.) coupled to the housing, the one or more input elements configured to be actuable (e.g., pressable, manipulable, etc.) by a user of the computer peripheral device and an optical sensor coupled to the housing, the optical sensor configured to generate optical data corresponding to a surface that the computer peripheral device is placed upon. The computer peripheral device can have one or more processors coupled to the optical sensor and the housing and may be configured to determine a relative displacement of the computer peripheral device along the surface based on the optical data, identify one or more characteristics of the surface (e.g., the surface identity values) based on the optical data, compare the one or more characteristics with one or more corresponding baseline (e.g., reference) characteristics stored in memory (e.g., surface identity value(s) for surface types stored in optical sensor flash), classify a type of the surface based on the comparing of the one or more characteristics with one or more corresponding baseline characteristics, and adjust an aspect of the determination of the relative displacement of the peripheral device, and/or an operation of the optical sensor that alters the generating of the optical data based on the classified type of the surface.

In some embodiments, the computer peripheral device (e.g., using any of methods 900-1100 and/or system 200 or any of the various embodiments described herein) can use a detected characteristic profile of the surface for "zeroing" a spot position as being the nominal for that given surface. For example, once the surface is known and confirmed, the computer mouse can better account for a given spot shift, which is normal and due to the nature of the surface. Having trustable information can allow the system to decouple spot shift due to lift (mouse not well in contact) and spot shift due to a nature and reflectance of the surface. In some embodiments, a front end to logic conversion threshold (e.g., Analog to Digital) can be adjusted (e.g., increase performance) based on the surface characteristics as well. In some embodiments, a computer mouse can have a predefined sensor mode (e.g., gaming or office mode) where the sensor and/or mouse operation is defined based on the identified surface. For instance, a surface classification that indicates a glass surface or wood table may signify to the system that the computer mouse is likely being used in an office environment rather than a gaming environment (given the low quality of surface characteristics) and auto-switch the mouse to operate accordingly (e.g., switch to a lower performance, low power state, etc.), as would be appreciated by one of ordinary skill in the art with the benefit of this disclosure.

Figure 11:
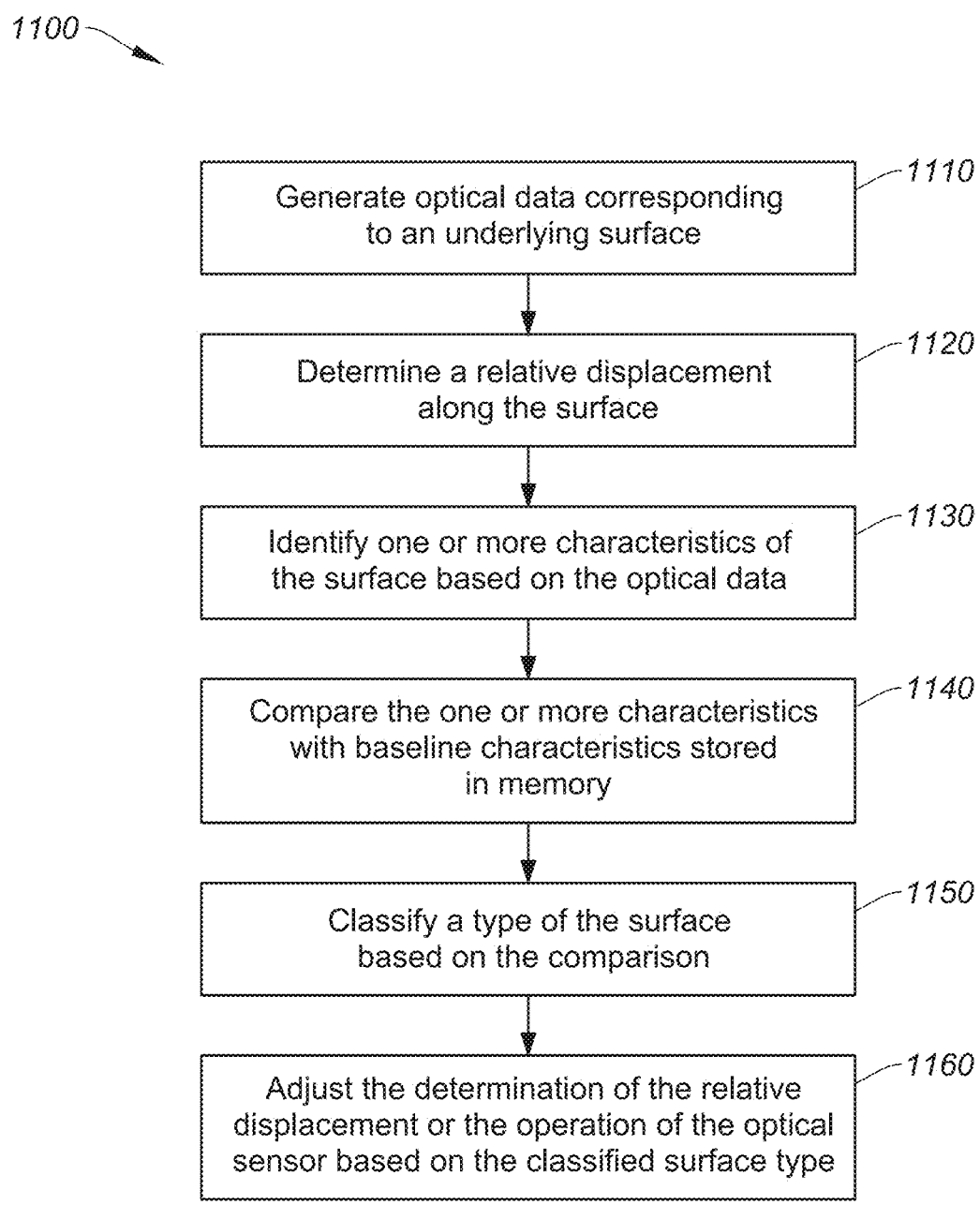
FIG. 11 is a simplified flow chart showing aspects of a further method for improving computer peripheral device tracking accuracy on a work surface using surface classification and sensor tuning, according to certain embodiments.

FIG. 11 is a simplified flow chart showing aspects of a method 1100 for improving computer peripheral device tracking accuracy on a work surface using surface classification and sensor tuning, according to certain embodiments.

Method 1100 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 1100 can be performed by aspects of processor(s) 210, memory 220, input detection module 250 (e.g., controlling aspects of optical sensor 480), or any combination thereof.

At operation 1110, method 1100 can include generating optical data corresponding to an underlying surface, according to certain embodiments.

At operation 1120, method 1100 can include determining a relative displacement along the surface, according to certain embodiments.

At operation 1130, method 1100 can include identifying one or more characteristics of the surface based on the optical data, according to certain embodiments. In some cases, the characteristics can include at least one of a surface brightness, surface contrast, and/or a number or density of surface features.

At operation 1140, method 1100 can include comparing the one or more characteristics with baseline characteristics stored in memory, according to certain embodiments. In some implementations, the comparing includes matching a pattern stored in memory with a pattern captured from the surface using the optical sensor. The computer peripheral device may include a plurality of stored characteristic profiles each corresponding to a respective surface type and is applied based on the classified type of surface.

At operation 1150, method 1100 can include classifying a type of the surface based on the comparison, according to certain embodiments. In some cases, classifying can be done, for example, by a decision tree algorithm, a heuristic algorithm, or a machine-learned algorithm (e.g., learned decision tree, k-Nearest Neighbor, support vector machine, Random Forest, neural network, etc.), as would be appreciated by one of ordinary skill in the art with the benefit of this disclosure.

At operation 1160, method 1100 can include adjusting the determination of the relative displacement or the operation of the optical sensor based on the classified surface type, according to certain embodiments. In some embodiments, two different sets of optical data can be generated by the optical sensor, where the first set of optical data is used by the one or more processors for computing the relative displacement of the computer peripheral device along the surface, and where the second set of optical data is used by the one or more processors for classifying the surface. In some cases, the first set of optical data and the second set of optical data can be generated at different times by a time-divisional multiplexing control schema.

In further embodiments, before the type of surface is classified, the one or more processors can be configured to determine the relative displacement of the computer peripheral device along multiple types of surfaces at a first accuracy threshold. After the type of surface is classified, the one or more processors may be configured to determine the relative displacement of the computer peripheral device along the classified type of surface at a second accuracy threshold that is higher than the first accuracy threshold and along surfaces other than the classified type of surface at a range spanning from the first accuracy threshold and lower.

In some embodiments, the classification of the surface type can be performed dynamically depending on at least one of a number of features per area detected by the optical sensor and/or a detection of an invalid or unlikely movement.

In further embodiments, adjusting the aspect the operation of the optical sensor can include at least one of: adjust a current or range of an LED used by the computer peripheral device to reflect light off of the surface, wherein the optical sensor generates the optical data based on the reflected light; adjust an exposure setting for the optical sensor; adjust a white level setting for the optical sensor; adjust a pixel integration time for the optical sensor; adjust a dots-per-inch (DPI) scaling factor; adjust an active pixel array position or size; or adjust an optical sensor report rate.

In some embodiments, adjusting the aspect of the determination of the relative displacement includes at least one of: adjust a number of memory slots used to store progressively captured images generated by the optical sensor; adjust a contrast ratio used to detect surface features on the surface; adjust a threshold number of features used to detect the relative displacement; adjust a threshold contrast used to identify the surface features; adjust a threshold brightness used to identify the surface features; or adjust a threshold size used to identify the features. Alternatively or additionally, the computer peripheral device can include exterior lighting elements that are adjusted depending on whether a particular type of surface is currently detected.

It should be appreciated that the specific steps illustrated in FIG. 11 provide a particular method 1100 for improving computer peripheral device tracking accuracy on a work surface using surface classification and sensor tuning, according to certain embodiments. Other sequences of steps may also be performed according to alternative embodiments. Furthermore, additional steps may be added or removed depending on the particular applications.

Surface Classification Data from an External Source

In the embodiments described above, surface classification is done by the peripheral computer device by obtaining optical data, determining surface characteristics and generating a surface identity vector, comparing the surface characteristics to saved baseline surface types to tune the optical sensor to operate better with the determined surface characteristics. In some cases, the surface characteristics are compared to a baseline value. In each of these scenarios, the surface type is determined by the computer peripheral device. In some embodiments, a surface type and corresponding surface identity features can be obtained from an external source, allowing the computer peripheral device to be quickly tuned to improve movement tracking on the particular surface type without requiring the rigorous computations described above.

In some embodiments, the surface type can be reported by the surface itself, e.g., by a mouse pad. The mouse pad could, for instance through certified reporting, actively report its characteristics to the computer peripheral device.

Figure 12A:
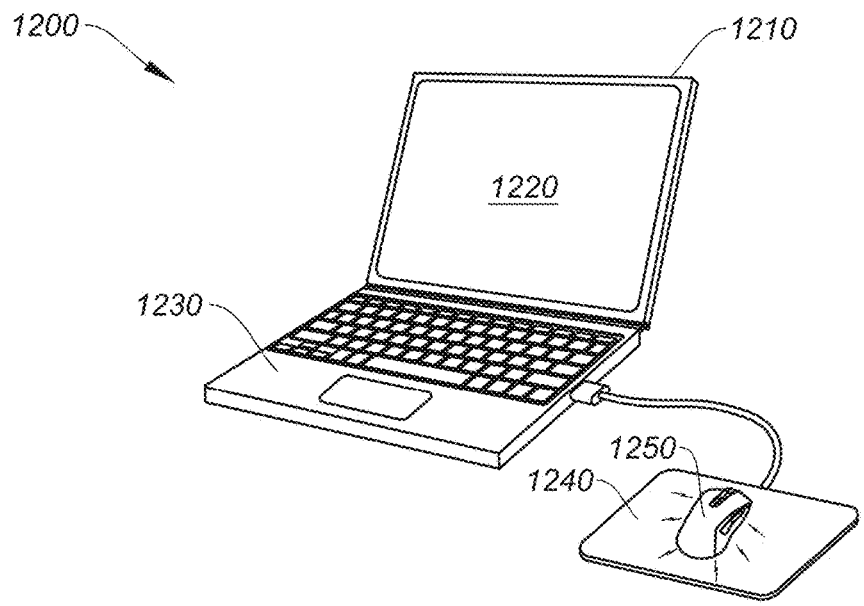
FIG. 12A shows a powered mousepad coupled to a laptop computer with a display and keyboard.

FIG. 12A shows a powered mousepad 1240 coupled to a laptop computer 1210 with a display 1120 and keyboard 1230, according to certain embodiments. The powered mousepad 1240 can be configured to wirelessly transmit power and data to a computer peripheral device 400, according to certain embodiments. The powered mousepad (e.g., Logitech PowerPlay®) may send machine-readable data corresponding to one or more surface identity values of the mousepad. The computer peripheral device 400 may tune its surface tracking methodology (e.g., tune the optical sensor) based on the surface identity values, which may computed or determined based on a similar surface type stored in memory of computer peripheral device 400.

Figure 12B:
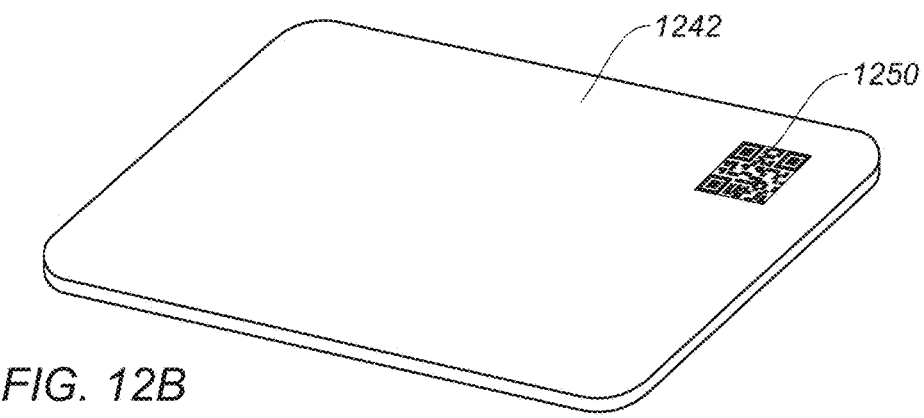
FIG. 12B shows a QR code configured on a mouse pad, according to certain embodiments.

FIG. 12B shows a QR code 1250 configured on a mouse pad 1242, according to certain embodiments. QR code 1250 (or similar printed encoding schema) may have encoded machine-readable data corresponding to one or more surface identity values of mousepad 1242. The computer peripheral device 400 may tune the optical sensor based on the surface identity values, which may computed or determined based on a similar surface type stored in memory of computer peripheral device 400. In some aspects, surface information can be micro-encoded in the mousepad such that the optical sensor can readily be used to detect the type of surface and detect when the sensor is no longer sensing that particular surface. The surface itself may have a certain pattern and/or color combination instead of a having a code itself that can be detectable by a mouse and matched to a performance set.

Figure 12C:
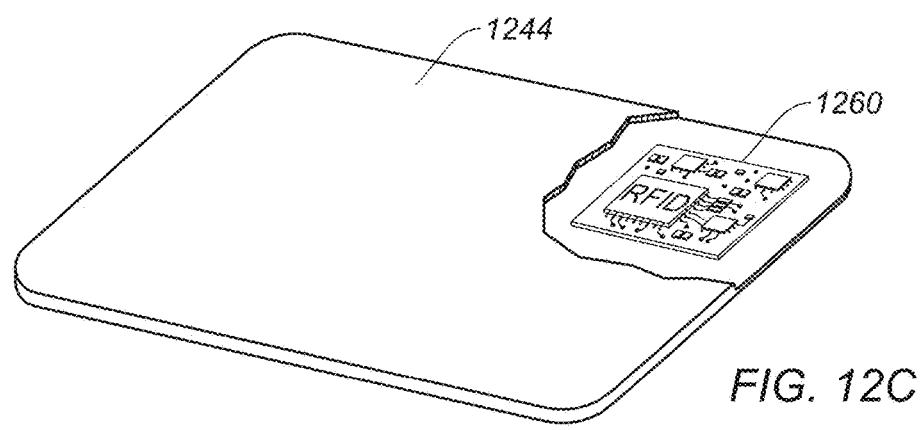
FIG. 12C shows an RFID circuit configured within a mouse pad, according to certain embodiments.

FIG. 12C shows an RFID circuit 1260 configured within a mouse pad 1244, according to certain embodiments. RFID circuit 1260 may be battery powered or may be powered by the host computing device (e.g., via USB connection). In some embodiments, the RFID circuit can be passive and can be configured to receive power by the reader device (e.g., computer mouse), which can be possible as the amount of data can be relatively low. RFID circuit 1260 may transmit encoded machine-readable data to the computer peripheral device 400 (or indirectly through a host computing device) that corresponds to one or more surface identity values of mousepad 1244. The computer peripheral device 400 may tune the optical sensor based on the surface identity values, which may computed or determined based on a similar surface type stored in memory of computer peripheral device 400. In some embodiments, other wireless methods (e.g., RF) or wired methods (e.g., USB, FireWire, etc.) can report surface identity values to the host computer or directly to the computer peripheral device. In some embodiments, a near-field communications (NFC) device or other passive circuit can be wirelessly interrogated by the computer mouse. In some cases, wireless power transfer can have surface information encoded therein whether it is RF, inductive, capacitive, magnetic, etc. In some embodiments, a mouse may switch off of the surface classification tuning when the mouse is no longer on a surface. NFC or other techniques can be used wherein the data transfer has a limited wireless transfer range, which can make detecting it possible when in close range, and can be used to control when surface tracking should be applied. In certain embodiments, a computer mouse can be operated in a time-sliced mode where the mouse classifies the surfaces in one time period and detects 2D movement in another time period. Using this concept, the mouse may disable the time period when the surface is classified (or between time periods of periodically rechecking the surface classification), improving power performance and/or tracking capabilities (enabling higher framerates, for example).

Figure 12D:
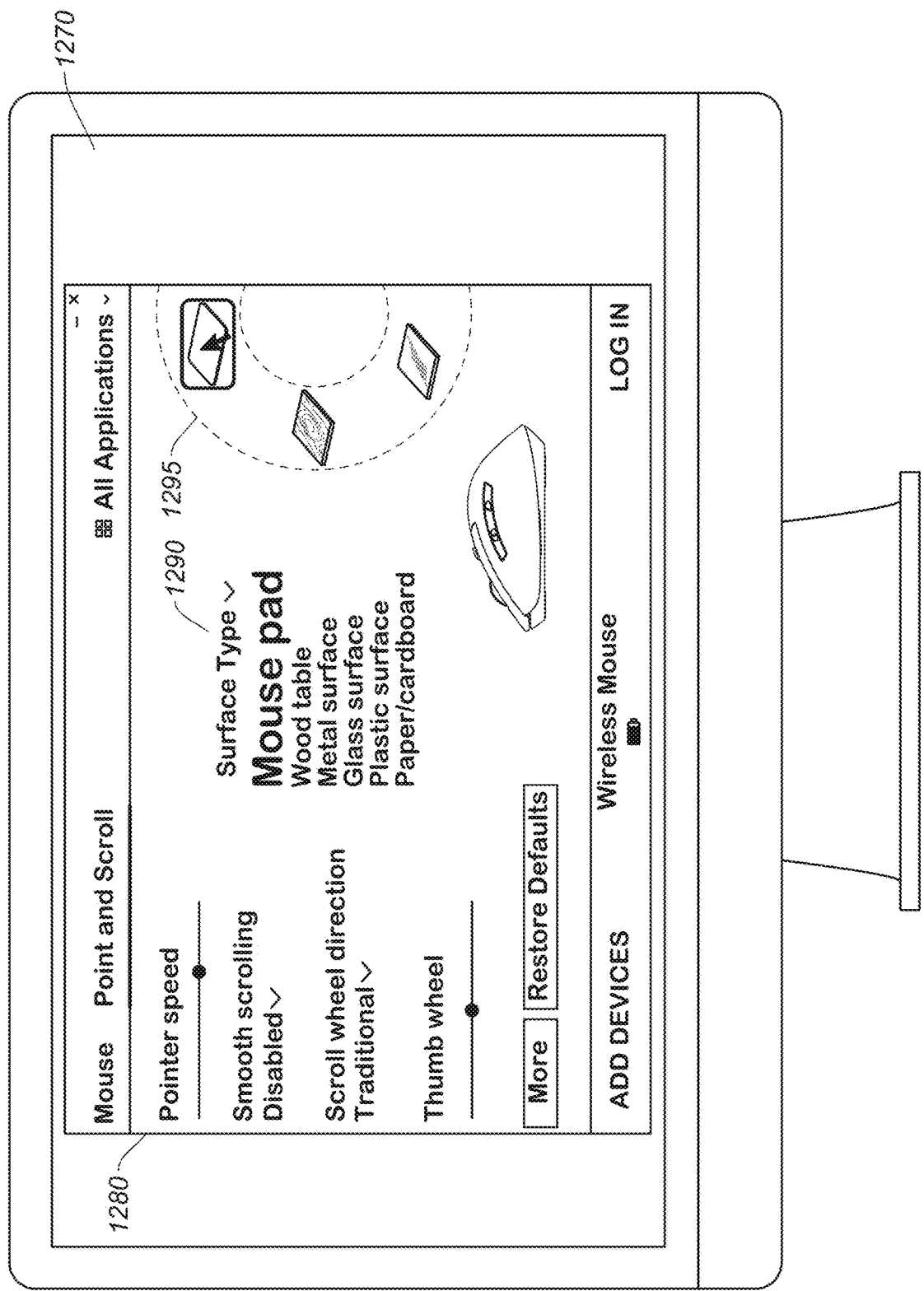
FIG. 12D shows a graphical user interface (GUI) on a display that is configured for selecting a surface type to be used by a computer peripheral device, according to certain embodiments.
Figure 13:
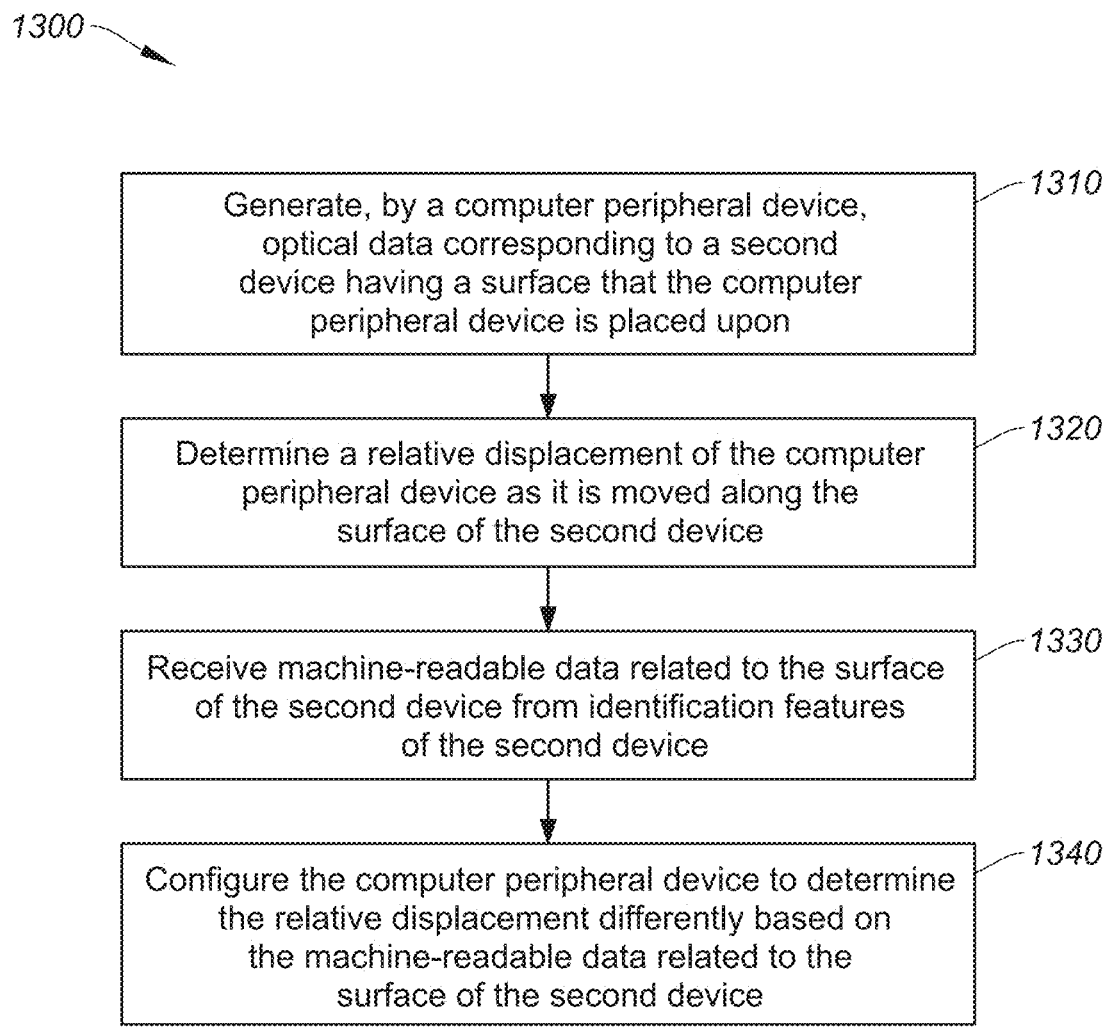
FIG. 13 is a simplified flow chart showing aspects of a method for improving computer peripheral device tracking accuracy on a work surface using surface classification data received from an external source, according to certain embodiments.

FIG. 12D shows a graphical user interface (GUI) 1280 on a display 1270 that is configured for selecting a surface type to be used by a computer peripheral device, according to certain embodiments. GUI 1280 may be configured to receive user inputs to select a particular surface type to be used (e.g., mouse pad, wood desk, glass table, etc.) and transmit encoded machine-readable data corresponding to the selected surface type to the computer peripheral device 400 that includes one or more surface identity values of the selected surface to be used. Referring to FIG. 12D, the user selected a mouse pad in the selector carousel, which is reflected in the drop down menu showing that the "mouse pad" is selected. A user may select a surface type icon, select a name from a drop down menu, or type a surface type identifier that can access surface identity values for the selected surface from a look up table or other data base, as would be appreciated by one of ordinary skill in the art with the benefit of this disclosure FIG. 13 is a simplified flow chart showing aspects of a method 1300 for improving computer peripheral device tracking accuracy on a work surface using surface classification data received from an external source, according to certain embodiments. Method 1300 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 1300 can be performed by aspects of processor(s) 210, memory 220, input detection module 250 (e.g., controlling aspects of optical sensor 480), or any combination thereof, or a combination thereof. In the context of method 1300, a "first device" may refer to and underlying device with a surface, such as a mouse pad, and a "second device" may refer to a computer peripheral device, such as a computer mouse.

At operation 1310, method 1300 can include generating, by a sensor on a computer peripheral device (e.g., a computer mouse 400), optical data corresponding to a first device (e.g., a mousepad, table, desk, etc.) having a surface that the computer peripheral device is placed upon, according to certain embodiments.

At operation 1320, method 1300 can include determining a relative displacement of the computer peripheral device as it is moved along the surface of the first device, according to certain embodiments.

At operation 1330, method 1300 can include receiving machine-readable data related to the surface of the first device from identification features of the first device, according to certain embodiments. The identification features can include surface features such as a QR code or other electronically scannable features. In some cases, the identification feature can be an RFID chip or other device that can electronically interface (e.g., via hardwired or wireless connection) with a computer peripheral device. The machine-readable data related to the surface of the first device may be one or more surface identity values.

At operation 1340, method 1300 can include configuring the computer peripheral device to determine the relative displacement differently based on the machine-readable data related to the surface of the first device, according to certain embodiments.

In some embodiments, the first device can include a non-contact power transmitter (e.g., a powered mouse pad), the second device may receive power from the transmitter, and the machine-readable data related to the surface can be encoded in the power transmitted from the first device to the second device, as shown for example in FIG. 12A.

In some embodiments, the identification feature may be a near-field communication (NFC)-type short range non-contact processor that is detectable by the second device when the second device is in close proximity to the first device. In some implementations, the determining the relative displacement along the surface differently based on the machine-readable data related to the surface includes switching from a first surface tuning profile to a second surface tuning profile, where the second device reverts back from the second surface tuning profile to the first surface tuning profile when not in proximity to the first device.

In some cases, the sensor can be an optical sensor, and the identification feature can be a pattern encoded onto the surface that is readable by the optical sensor, such as the QR code depicted in FIG. 12B. In some aspects, the machine-readable data related to the surface can be a reference used by the second device to locate surface tuning information (e.g., via a lookup table). The data related to the surface may characterize the surface directly and can be used by the second device for its own tuning. In some aspects, the second device may include a universal tuning mechanism that is overridden when it detects the data related to the surface. In certain embodiments, the surface may be selected (e.g., selecting a surface identity vector) by the user from a list of options, such as via a GUI on a computer screen, as shown in FIG. 12D.

It should be appreciated that the specific steps illustrated in FIG. 13 provide a particular method 1300 for improving computer peripheral device tracking accuracy on a work surface using surface classification data received from an external source (e.g., a surface or GUI), according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

In some embodiments, a system can implement the various aspects of method 1300. For instance a system may comprise a first device (e.g., mouse pad) including a surface and an identification feature, where the identification feature includes or encodes machine-readable data related to the surface. The system may include a second device (e.g., computer peripheral device such as a computer mouse) including a sensor and one or more processors coupled to the sensor. The one or more processors can be configured to determine a relative displacement of the second device as it is moved along the surface of the first device by a user of the second device, receive the machine-readable data related to the surface from the identification feature of the first device, and configure the second device to determine the relative displacement along the surface differently based on the machine-readable data related to the surface. In some cases, determining the relative displacement different may correspond to performing a surface classification procedure, as described above with respect to FIGS. 9-11. However, in the present case, the surface type if provided by the underlying device (first device) so that the second device (computer mouse) can adapt the operation of its sensor (optical sensor) to improve (e.g., optimize) its tracking parameters relative to the known surface. In other words, instead of tuning the optical sensor to operate over a wide range of surfaces, which typically requires performance trade-offs to accommodate varying surface qualities and features, the optical sensor can be finely tuned to a known surface (or known with sufficient confidence) so that tracking can be improved, less power may be utilized, and the other myriad benefits as described above.

In some aspects, the first device can include a non-contact power transmitter, the second device receives power from the transmitter, and the machine-readable data related to the surface can be encoded in the power transmitted from the first device to the second device. In further embodiments, the identification feature can be a near-field communication (NFC)-type short range non-contact processor that is detectable by the second device when the second device is in close proximity to the first device, where the determining the relative displacement along the surface differently based on the machine-readable data related to the surface includes switching from a first surface tuning profile to a second surface tuning profile, and where the second device reverts back from the second surface tuning profile to the first surface tuning profile when not in proximity to the first device. In some cases, the sensor is an optical sensor, and the identification feature is a pattern encoded onto the surface that is readable by the optical sensor. The machine-readable data related to the surface can be a reference used by the second device to locate surface tuning information. The data related to the surface can characterize the surface directly and can be used by the second device for its own tuning. In some aspects, the second device includes a universal tuning mechanism that is overridden when it detects the data related to the surface. One of ordinary skill in the art with the benefit of this disclosure would appreciate the many modifications, variations, and alternative embodiments thereof.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

In embodiments utilizing a network server as the operation server or the security server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connections to other computing devices such as network input/output devices may be employed.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A computer-implemented method for operating a computer mouse, the method comprising:
   receiving an activation signal from the computer mouse;
   in response to receiving the activation signal, determining, based on optical data generated by an optical sensor of the computer mouse, a relative displacement of the computer mouse along an underlying surface;
   identifying a surface characteristic of the underlying surface based on the optical data;
   accessing surface characteristics of a plurality of surface profiles stored in memory;

comparing the surface characteristic of the underlying surface with the surface characteristics of the plurality of surface profiles stored in memory;

classifying a surface type of the underlying surface as one of the plurality of surface profiles stored in memory when the surface characteristic of the underlying surface matches a surface characteristic of the one of the plurality of surface profiles stored in memory; and modifying, based on the classified surface type of the underlying surface, an aspect of the determination of the relative displacement of the computer mouse or an operation of the optical sensor that alters the optical data.

2. The computer-implemented method of claim 1 wherein the activation signal includes a signal that causes the computer mouse to switch from a non-displacement tracking state to a tracking displacement state.

3. The computer-implemented method of claim 1 further comprising:

generating a new profile and corresponding surface type classification when the identified surface characteristic does not match at least any one of the surface characteristics of the stored surface profiles;

storing the new surface profile and corresponding surface type classification in memory; and making the stored new surface profile available as one of the plurality of surface profiles for subsequent comparisons of surface characteristics.

4. The computer-implemented method of claim 1 wherein two different sets of optical data are generated by the optical sensor, wherein a first set of optical data is used by the one or more processors for computing the relative displacement of the computer mouse along the surface, and wherein a second set of optical data is used by the one or more processors for classifying the surface.

5. The computer-implemented method of claim 4 wherein the first set of optical data and the second set of optical data are generated at different times by a time-divisional multiplexing control schema.

6. The computer-implemented method of claim 1 wherein the modifying the aspect the operation of the optical sensor includes at least one of:

adjust a current or range of an LED used by the computer mouse to reflect light off of the surface, wherein the optical sensor generates the optical data based on the reflected light;

adjust an exposure setting for the optical sensor;

adjust a white level setting for the optical sensor;

adjust a pixel integration time for the optical sensor;

adjust a dots-per-inch (DPI) scaling factor;

adjust an optical sensor flash rate;

adjust an optical sensor image filtering algorithm;

adjust an optical sensor displacement computation algorithm;

adjust an active pixel array position or size; or adjust an optical sensor report rate.

7. The computer-implemented method of claim 1 wherein the modifying the aspect of the determination of the relative displacement includes at least one of:

adjusting a number of memory slots used to store progressively captured images generated by the optical sensor;

adjusting a contrast ratio used to detect surface features on the surface;

adjusting a threshold number of features used to detect the relative displacement;

adjusting a threshold contrast used to identify the surface features;

adjusting a threshold brightness used to identify the surface features; or adjusting a threshold size used to identify the features.

8. A computer peripheral device, comprising:

a housing;

a communication module coupled to the housing, the communication module configured to communicatively couple the computer peripheral device with a host computer device;

one or more input elements coupled to the housing, the one or more input elements configured to be actuable by a user of the computer peripheral device;

an optical sensor coupled to the housing, the optical sensor configured to generate optical data corresponding to an underlying surface that the computer peripheral device is placed upon;

one or more processors coupled to the optical sensor and the housing, the one or more processors configured to:

receive an activation signal;

in response to receiving the activation signal, determine, based on optical data generated by an optical sensor of the computer peripheral device, a relative displacement of the computer peripheral device along the underlying surface;

identify a surface characteristic of the underlying surface based on the optical data;

access surface characteristics of a plurality of surface profiles stored in memory;

compare the surface characteristic of the underlying surface with the surface characteristics of the plurality of surface profiles stored in memory;

classify a surface type of the underlying surface as one of the plurality of surface profiles stored in memory when the surface characteristic of the underlying surface matches a surface characteristic of the one of the plurality of surface profiles stored in memory; and modify, based on the classified surface type of the underlying surface, an aspect of the determination of the relative displacement of the computer peripheral device or an operation of the optical sensor that alters the optical data.

9. The computer peripheral device of claim 8 wherein the activation signal includes a signal that causes the computer peripheral device to switch from a non-displacement tracking state to a tracking displacement state.

10. The computer peripheral device of claim 8 wherein the one or more processors are further configured to:

generate a new profile and corresponding surface type classification when the identified surface characteristic does not match at least any one of the surface characteristics of the stored surface profiles;

store the new surface profile and corresponding surface type classification in memory; and make the stored new surface profile available as one of the plurality of surface profiles for subsequent comparisons of surface characteristics.

11. The computer peripheral device of claim 8 wherein two different sets of optical data are generated by the optical sensor, wherein a first set of optical data is used by the one or more processors for computing the relative displacement of the computer peripheral device along the surface, and wherein a second set of optical data is used by the one or more processors for classifying the surface.

12. The computer peripheral device of claim 11 wherein the first set of optical data and the second set of optical data are generated at different times by a time-divisional multiplexing control schema.

13. The computer peripheral device of claim 8 wherein the modifying the aspect the operation of the optical sensor includes at least one of:
   adjust a current or range of an LED used by the computer peripheral device to reflect light off of the surface, wherein the optical sensor generates the optical data based on the reflected light;
   adjust an exposure setting for the optical sensor;
   adjust a white level setting for the optical sensor;
   adjust a pixel integration time for the optical sensor;
   adjust a dots-per-inch (DPI) scaling factor;
   adjust an optical sensor flash rate;
   adjust an optical sensor image filtering algorithm;
   adjust an optical sensor displacement computation algorithm;
   adjust an active pixel array position or size; or
   adjust an optical sensor report rate.

14. The computer peripheral device of claim 8 wherein the modifying the aspect of the determination of the relative displacement includes at least one of:
   adjusting a number of memory slots used to store progressively captured images generated by the optical sensor;
   adjusting a contrast ratio used to detect surface features on the surface;
   adjusting a threshold number of features used to detect the relative displacement;
   adjusting a threshold contrast used to identify the surface features;
   adjusting a threshold brightness used to identify the surface features; or
   adjusting a threshold size used to identify the features.

* * * * *